(12) United States Patent
Iinuma

(10) Patent No.: US 7,357,518 B2
(45) Date of Patent: Apr. 15, 2008

(54) PROJECTOR

(75) Inventor: Kazuyuki Iinuma, Hotaka-town (JP)

(73) Assignee: Seiko Epson Corporation, Tokyo (JP)

( * ) Notice: Subject to any disclaimer, the term of this patent is extended or adjusted under 35 U.S.C. 154(b) by 392 days.

(21) Appl. No.: 11/142,490

(22) Filed: Jun. 2, 2005

(65) Prior Publication Data

US 2005/0270502 A1    Dec. 8, 2005

(30) Foreign Application Priority Data

Jun. 3, 2004  (JP) .............................. 2004-166273
May 31, 2005 (JP) .............................. 2005-159974

(51) Int. Cl.
- *G03B 3/00* (2006.01)
- *G03B 27/52* (2006.01)
- *G02B 7/02* (2006.01)
- *G11B 7/00* (2006.01)

(52) U.S. Cl. ...................... 353/101; 359/813; 359/823; 355/55; 369/44.15

(58) Field of Classification Search ................ 353/100, 353/101; 359/811, 813, 819, 823, 694; 355/44, 355/55; 369/44.15, 44.16
See application file for complete search history.

(56) References Cited

U.S. PATENT DOCUMENTS

| | | | | |
|---|---|---|---|---|
| 5,465,126 | A * | 11/1995 | Fukuda ........................ | 353/101 |
| 6,469,839 | B2 * | 10/2002 | Agata ........................... | 359/694 |
| 7,215,477 | B2 * | 5/2007 | Yamasaki et al. ........... | 359/649 |
| 2005/0057732 | A1 * | 3/2005 | Hayashi ....................... | 353/101 |

FOREIGN PATENT DOCUMENTS

| | | | |
|---|---|---|---|
| JP | A | 63-197926 | 8/1988 |
| JP | A | 05-040309 | 2/1993 |
| JP | A | 05-196888 | 8/1993 |
| JP | A | 06-051179 | 2/1994 |
| JP | A | 07-287190 | 10/1995 |
| JP | A | 09-230284 | 9/1997 |
| JP | B2 | 2946556 | 7/1999 |
| JP | B2 | 2956977 | 7/1999 |
| JP | A | 2000-089284 | 3/2000 |
| JP | B2 | 3050927 | 3/2000 |
| JP | A | 2000-250130 | 9/2000 |
| JP | A | 2003-035920 | 2/2003 |
| JP | A | 2003-043328 | 2/2003 |
| JP | A | 2003-075768 | 3/2003 |
| JP | B2 | 3405061 | 3/2003 |
| JP | B2 | 3439441 | 6/2003 |
| JP | A | 2003-315648 | 11/2003 |
| JP | B2 | 3495860 | 11/2003 |

* cited by examiner

*Primary Examiner*—Melissa Jan Koval
(74) *Attorney, Agent, or Firm*—Oliff & Berridge, PLC

(57) ABSTRACT

A projector includes a light source; an optical modulator; a projection lens, which has a lens barrel containing plural lenses, for projecting the optical image; as well as a structure showing a substantially L-shaped lateral contour and including an inner horizontal section, to which the optical modulator is attached, and an outer vertical section, to which the projection lens is attached; and a lens shifting mechanism for shifting the projection lens along the outer vertical section. The lens barrel has a flange projecting to the outside of the lens barrel at the base end side of the projection direction so that the lens barrel is fitted to the outer vertical section. The outer vertical section has a lens contacting surface projected and curved in accordance with curvature amount of the image forming surface on the base end side of the projection lens so as to contact the flange.

13 Claims, 16 Drawing Sheets

PROJECTOR

BACKGROUND OF THE INVENTION

1. Field of the Invention

The present invention relates to a projector having a light source, an optical modulator for modulating light beam emitted from the light source according to image information and forming an optical image, and a projection lens, which has a plurality of lenses and a lens barrel for containing the plurality of lenses thereinside, for enlarging and projecting the optical image formed by the optical modulator.

2. Description of Related Art

Projectors have been and being popularly used for the purpose of presentation in conferences, academic meetings, exhibitions and so on and also for the purpose of enjoying movies or the like at home. Such projectors include a light source, an optical modulator for modulating light beam emitted from the light source according to image information and forming an optical image and a projection lens for enlarging and projecting the optical image formed by the optical modulator.

While it is ideal for such projectors to project an optical image in a direction perpendicular to the plane of projection such as a screen, they are often made to project an optical image obliquely onto the plane of projection from above or from below in actual applications. Then, there arises a problem of trapezoidal distortion that the projected image is distorted to show an upwardly or downwardly expanding trapezoidal contour. When a trapezoidal distortion occurs, the projected image goes out of focus and becomes blurred partially either in an upper area or in a lower area thereof because the image forming position of the projected image shows a positional discrepancy between the upper area and the lower area.

Projectors adapted to vertically shift the projection lens have been proposed to cope with this problem (see, for example, Japanese Patent Laid-Open Publication No. 2003-315648). Such projectors can dissolve the problem of projecting a partially burred image by vertically translating the projection lens and adjusting image forming position of the projected image relative to the plane of projection. As a result, it is possible to clearly project an optical image.

However, with the technique described in the above-cited patent document, the central axis of the light beam emitted from the optical modulator and entering the projection lens is moved away from the optical axis of the projection lens as the projection lens is translated vertically so that consequently the focal position of the projection lens can be moved out of the image forming region of the optical modulator. More specifically, the focal length of the projection lens that is employed for a projector tends to be decreased as the height of the projected image is increased. Thus, as the projection lens is translated vertically to increase the distance between the central axis of the light beam emitted from the optical modulator and the optical axis of the projection lens, it may be no longer possible to place the focal position of the projection lens in the image forming region of the optical modulator. Then, there arises a problem of degradation of the projected image due to the field curvature of the projection lens.

While it may be conceivable to use a projection lens that is free from field curvature, such a lens is costly and hence the cost of manufacturing a projector having such a projection lens will become prohibitive.

SUMMARY OF THE INVENTION

Therefore, it is an object of the present invention to provide a projector at low cost that can correct the problem of projecting a partially blurred image and at the same time the problem of field curvature of the projection lens.

A projector according to an aspect of the present invention has a light source; an optical modulator for modulating light beam emitted from the light source according to image information and forming an optical image; and a projection lens, which includes a plurality of lenses and a lens barrel for containing the plurality of lenses thereinside, for enlarging and projecting the optical image formed by the optical modulator; the projector including a structure showing a substantially L-shaped lateral contour and including an inner horizontal section, to which the optical modulator is attached, and an outer vertical section, to which the projection lens is attached, each of both sections having an L-shaped lateral contour; and a lens shifting mechanism for shifting the projection lens in a direction orthogonal to the central axis of the light beam emitted from the optical modulator along the outer vertical section; in which the lens barrel has a flange projecting to the outside of the lens barrel at the base end side of the projection direction so as for the lens barrel to be fitted to the outer vertical section; the outer vertical section has a lens contacting surface projected and curved in accordance with curvature amount of the image forming surface on the base end side of the projection lens so as to contact the flange along the shifting direction being shifted by the lens shifting mechanism; and the projection lens moves along the lens contacting surface as the projection lens is shifted by the lens shifting mechanism.

Preferably, in a moving range of the projection lens along the lens contacting surface, the difference of protruding amount of the lens contacting surface is between 0.01 and 0.1 mm from a flat part of the outer vertical section.

Thus, according to the present invention, since the lens contacting surface is curved in accordance with curvature amount of the image forming surface at the base end side of the projection lens, it is possible to place the focal point of the projection lens in the optical image forming region of the optical modulator even when the projection lens is shifted in a direction perpendicular to the central axis of the light beam emitted from the optical modulator. Thus, it is possible to correct the partial blur, if any, of the projected image and correct the curvature of image of the projection lens. Therefore, it is possible to prevent degradation of the projected image and project a clear image.

Additionally, since the lens contacting surface is curved to correct the curvature of image of the projection lens, it is possible to prevent degradation of the projected image and eliminate the need of employing a costly lens or the like hat is free from curvature of image for the projection lens. Therefore, it is possible to broaden the choice of lens for the projector and manufacture the projector at low cost.

Still additionally, in the moving range of the projection lens along the lens contacting surface, when the difference of protruding amount of the lens contacting surface is made between 0.01 and 0.1 mm from a flat part of the outer vertical section, it is possible to produce a curved profile that is satisfactory for correcting the curvature of image of the projection lens employed for the projector.

According to the present invention, preferably, the lens shifting mechanism is adapted to shift the projection lens in the tilting direction of the projector and also in a direction perpendicular to the tilting direction and the lens contacting surface has a curved profile of which the protruding amount becomes smaller gradually from the center thereof toward peripheral edge.

With this arrangement, it is possible to correct, by means of the lens shifting mechanism, the curvature of image of the projection lens not only when the projection lens is shifted in the tiling direction but also when the projection lens is shifted in a direction perpendicular to the tiling direction. Thus, it is possible to correct the curvature of image of the projection lens and prevent degradation of the projected image. Additionally, it is possible to project a clear image and improve the accuracy of the focal point of the projection lens.

In the case where the lens contacting surface has a curved profile of which the protruding amount becomes smaller gradually from the center thereof toward peripheral edge, when the projection lens is shifted to an end of the lens contacting surface, the angle of the optical axis of the projection lens is increased relative to the central axis of the light beam emitted from the optical modulator so that the projected image can be partially blurred to a large extent.

Therefore, it is preferred that the lens contacting surface has a first curved surface section and a second curved surface section being formed along the peripheral edge of the first curved surface section, the protruding amount of the second curved surface section being larger than that of the peripheral edge of the first curved surface section. By letting the lens contacting surface have such a profile, it is possible to make the optical axis of the projection lens run substantially in parallel with the central axis of the light beam emitted from the optical modulator even when the projection lens is shifted to an end of the lens contacting surface. Thus, it is possible to improve the accuracy of correcting the partial blur, if any, of the projected image and also the degree of freedom of the projection lens for projecting an optical image.

According to the present invention, preferably, the lens shifting mechanism is arranged with a gap between itself and the outer vertical section so as to make it correspond to the lens contacting surface and cover the outer vertical section, the flange of the lens barrel is placed in the gap; and a biasing member is arranged between the flange and the lens shifting mechanism so as to bias the flange toward the outer vertical section to force the flange to contact with the lens contacting surface.

With the above-described arrangement, where the lens shifting mechanism is arranged with a gap between itself and the outer vertical section of the structure and the flange of the projection lens is placed in the gap, while a biasing member is arranged to bias the projection lens toward the lens contacting surface, it is possible to make the flange of the projection lens reliably contact the lens contacting surface and hence the projection lens reliably shifts along the lens contacting surface. Additionally, with the above-described arrangement for supporting the projection lens and biasing it by the biasing member, the projection lens can be supported and biased to contact the lens contacting surface in a simple manner. Additionally, the sliding performance of the projection lens on the lens contacting surface can be improved by adjusting the biasing force of the biasing member.

According to the present invention, preferably, contact sections are formed at the end of the flange along the shifting directions so as to project from the surface opposed to the lens contacting surface of the flange and contact the lens contacting surface.

With this arrangement, the projection lens and the lens contacting surface contact with each other by way of the contact sections formed on the surface opposed to the lens contacting surface of the flange so that the sliding performance of the projection lens that is shifted along the lens contacting surface is further improved.

A projector according to another aspect of the present invention has a light source; an optical modulator for modulating a light beam emitted from the light source according to image information; a projection lens, which includes a plurality of lenses and a lens barrel for containing the plurality of lenses thereinside, for enlarging and projecting the optical image formed by the optical modulator; a lens shifting mechanism having an operating section for shifting the projection lens in a direction crossing the central axis of the light beam emitted from the optical modulator; and a curved surface which crosses the central axis of the light beam emitted from the optical modulator at one point, the curved surface having a profile which curves in accordance with curvature amount of an image forming surface on a base end side of the projection lens, and the projection lens sliding along the curved surface by operating the operating section.

Herein, the curved surface is preferably formed in a manner of being protruded from a flat surface perpendicular to the central axis of the light beam emitted from the optical modulator; and, in the moving range of the projection lens along the curved surface, the difference of protruding amount of the curved surface is preferably between 0.01 and 0.1 mm from the flat surface.

According to the present invention, since the projection lens slides along the curved surface which is curved in accordance with curvature amount of the image forming surface at the base end side of the projection lens, it is possible to place the focal point of the projection lens in the optical image forming region of the optical modulator even when the projection lens is shifted. Thus, it is possible to correct the partial blur, if any, of the projected image and correct the image curvature of the projection lens. Therefore, it is possible to prevent degradation of the projected image and project a clear image.

Further, since the curvature of image of the projection lens is corrected by providing the curved surface which crosses the central axis of the light beam emitted from the optical modulator at one point, it is not necessary to employ, for example, an expensive lens which has no image curvature for a projector to prevent degradation of the projected image. Thus, it is possible to widen the range for selecting a lens for a projector and to reduce the manufacturing cost.

Further, in the moving range of the projection lens along the curved surface, when the difference of protruding amount of the curved surface is made between 0.01 and 0.1 mm from the flat surface, it is sufficient to correct the curvature of image of the projection lens being used for a projector.

According to the present invention, the lens shifting mechanism preferably is adapted to shift the projection lens in the tilting direction of the projector and also in a direction perpendicular to the tilting direction; and the curved surface preferably has a profile of which the protruding amount becomes smaller gradually from the center thereof toward peripheral edge.

With this arrangement, it is possible to correct, by means of the lens shifting mechanism, the curvature of image of the projection lens not only when the projection lens is shifted in the tiling direction but also when the projection lens is shifted in a direction perpendicular to the tilting direction.

Thus, it is possible to correct the curvature of image of the projection lens and prevent degradation of the projected image. Additionally, it is possible to project a clear image and improve the accuracy of the focal point of the projection lens.

According to the present invention, it is preferred that the projector further has a flange provided on the light incident side of the projection lens and protruding from the lens barrel toward the direction orthogonal to the optical axis of the projection lens; a perpendicular face perpendicular to the central axis of the light beam emitted from the optical modulator and included in the lens shifting mechanism, the flange being disposed between the perpendicular face of the lens shifting mechanism and the curved surface; and a contact section provided on a surface of the flange, the contact section protruding toward the curved surface side to contact the curved surface and sliding along the curved surface as the projection lens is shifted by the lens shifting mechanism.

With this arrangement, the projection lens, which shifts along the curved surface, can slide more smoothly.

In the case where the curved surface has a profile of which the protruding amount becomes smaller gradually from the center thereof toward peripheral edge, when the projection lens is shifted to an end of the curved surface, the angle of the optical axis of the projection lens is increased relative to the central axis of the light bean emitted from the optical modulator, so that the projected image can be partially blurred to a large extent. Therefore, it is preferred that the curved surface has a first curved surface section and a second curved surface section being formed along the peripheral edge of the first curved surface section, the protruding amount of the second curved surface being larger than that of the peripheral edge of the first curved surface section.

By letting the curved surface have such a profile, it is possible to make the optical axis of the projection lens run substantially in parallel with the central axis of the light beam emitted from the optical modulator when the projection lens is shifted to an end of the curved surface. Thus, it is possible to improve the accuracy of correcting the partial blur, if any, of the projected image and also the degree of freedom of the projection lens for projecting an optical image.

According to the present invention, it is preferred that the projector further has a biasing member arranged between the perpendicular face of the lens shifting mechanism and the flange so as to bias the flange toward the curved surface to bring the contact sections of the flange into contact with the curved surface.

With this arrangement, the flange of the projection lens can contact the curved surface securely, and thereby the shift of the projection lens along the curved surface can be performed securely. Further, since the projection lens is supported in the state of being biased by the biasing member, the structure for contacting the projection lens to the curved surface and for supporting the projection lens can be made simple. Furthermore, by adjusting the biasing force with the biasing member, the projection lens can slide along the curved surface more smoothly.

DETAILED DESCRIPTION OF THE PREFERRED EMBODIMENTS

1. First Embodiment

Now, the first embodiment of the present invention will be described by referring to the related accompanying drawings.

(1) External Configuration

Figure 1:
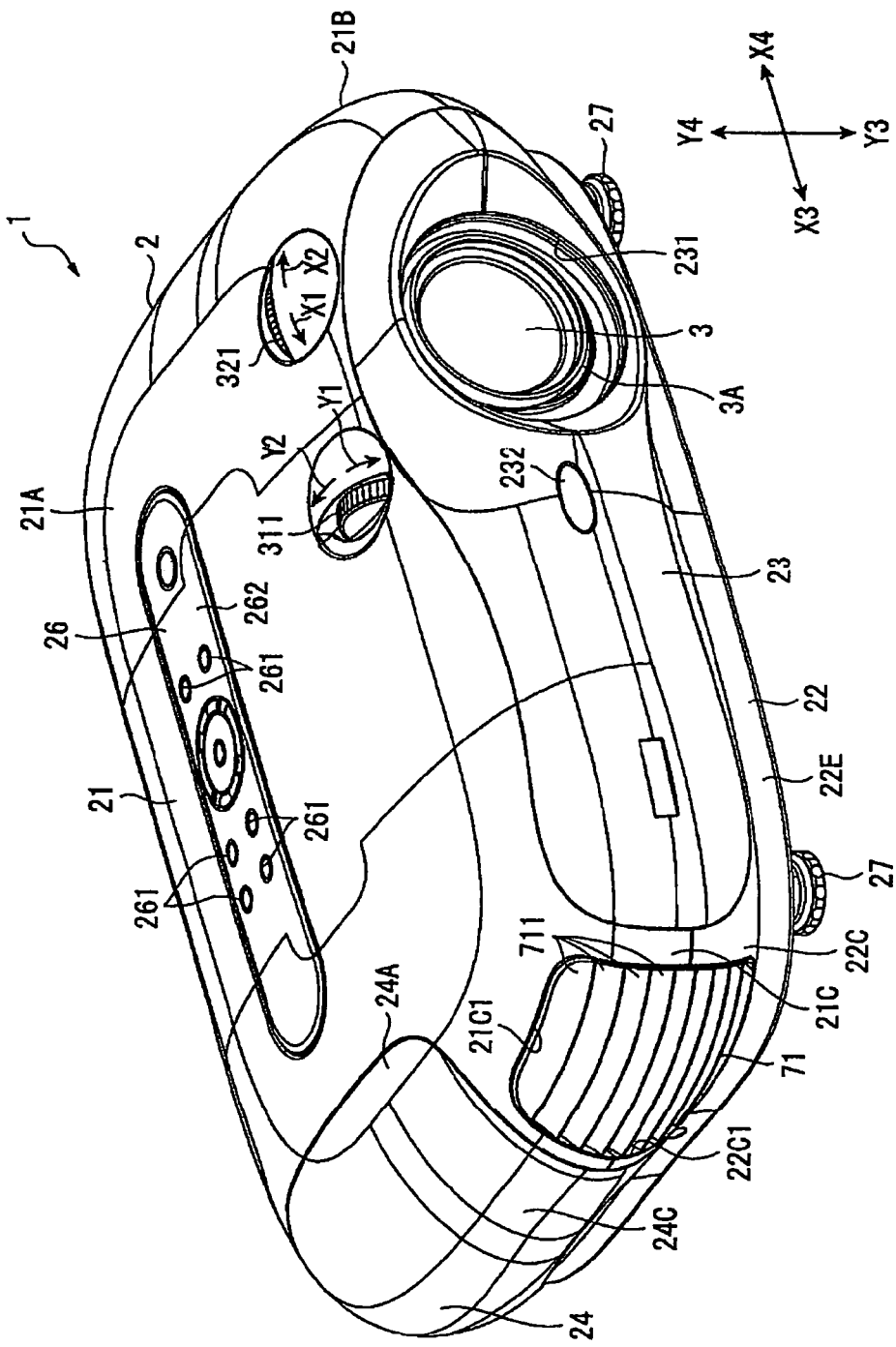
FIG. 1 is a schematic perspective view of a first embodiment of projector according to the present invention as viewed from the upper front side thereof.
Figure 2:
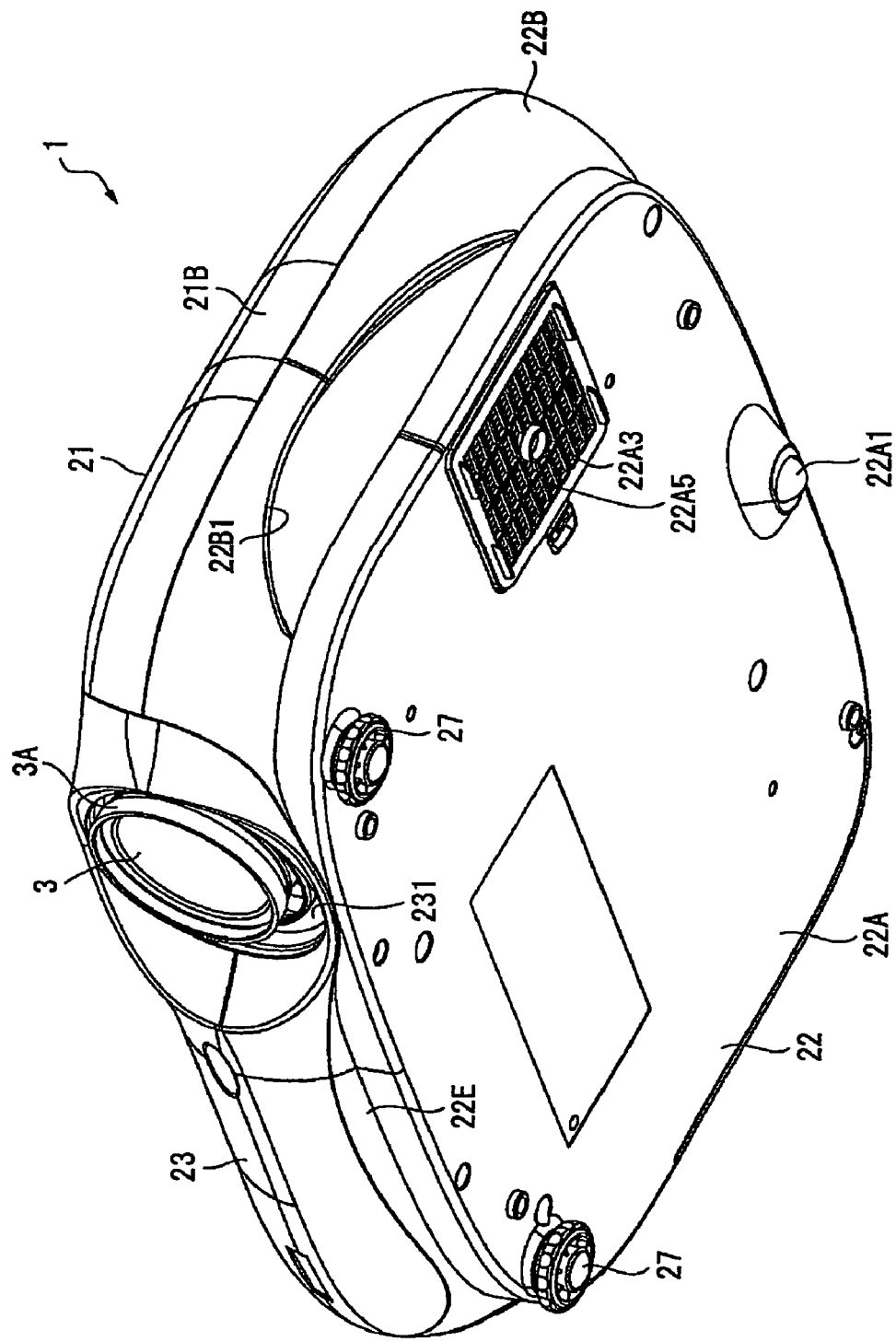
FIG. 2 is a schematic perspective view of the first embodiment of projector as viewed from the lower front side thereof.
Figure 3:
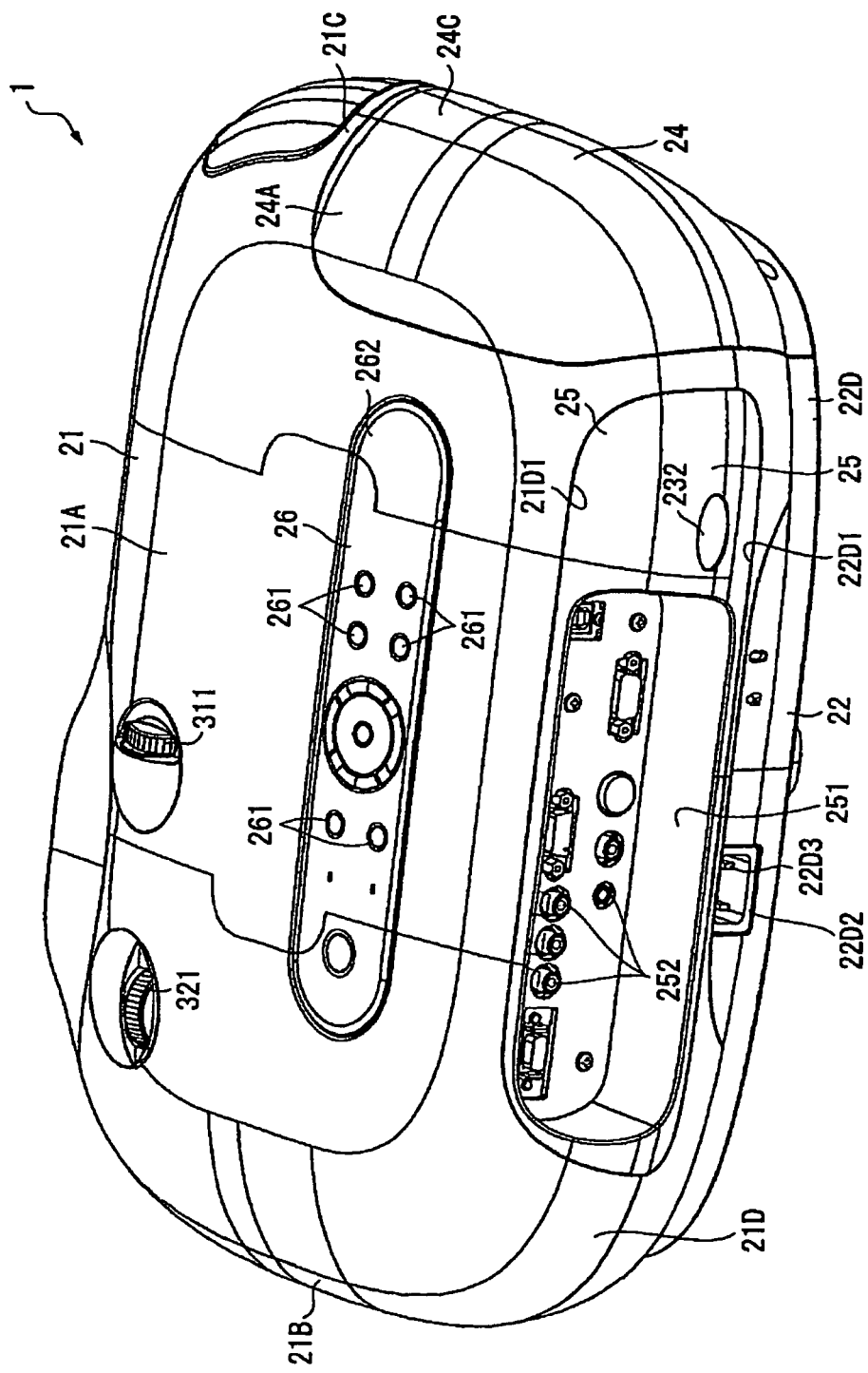
FIG. 3 is a schematic perspective view of the first embodiment of projector as viewed from the upper rear side thereof.

FIG. 1 is a schematic perspective view of the first embodiment of a projector 1 according to the present invention as viewed from above and from the front side thereof. FIG. 2 is a schematic perspective view of the projector 1 as viewed from below and from the front side thereof FIG. 3 is a schematic perspective view of the projector 1 as viewed from above and from the rear side thereof.

The projector 1 is adapted to modulate a light beam emitted from a light source according to image information and enlarge and project an optical image onto a plane of projection such as a screen. As shown in FIGS. 1 through 3, the projector 1 has a substantially rectangularly parallelepipedic exterior case 2 and a projection lens 3 exposed to the outside through the exterior case 2.

Of the above-listed components, the projection lens 3 has a function of operating as projection optical system for enlarging and projecting the optical image formed as a result of modulation by a later-described liquid crystal panels 441 (see FIG. 5) that operate as an optical modulator. It is a combination of a plurality of lenses contained in a lens holding barrel 3A, which is a lens barrel.

The exterior case 2 is a casing made of synthetic resin that shows a substantially rectangular plan view. It contains the main body of the projector 1 including an optical unit 4, which will be described in detail hereinafter. The exterior case 2 includes an upper case 21 for covering the top surface of the projector main body, a lower case 22 for covering the bottom surface of the projector main body, a front case 23 for covering the front surface of the projector main body, a side case 24 for covering a part of a lateral side of the projector main body and a rear case 25 for covering the rear surface of the projector main body (see FIG. 3).

Note that the corners of the top surface, the front surface, the lateral surfaces, the bottom surface and the rear surface are formed as curved surfaces.

The upper case 21 by turn includes a substantially rectangular top surface section 21A for covering the top surface part of the projector main body, a lateral surface section 21B suspended substantially vertically from the edge of one of the long sides of the top surface section 21A, another lateral surface section 21C suspended substantially vertically from the edge of the other long side of the top surface section 21A and a rear surface section 21D suspended from the edge of the rear side of the top surface section 21A (see FIG. 3).

As shown in FIGS. 1 and 3, a transversally extending operation panel 26 to be used for sing and adjusting operations of the projector 1 is arranged substantially at a middle part of the rear surface side of the top surface section 21A. As one of the operation buttons 261 arranged on the operation panel 26 is depressed, it is brought into contact with the corresponding one of the tact switches mounted in a circuit board (not shown) that is arranged in the inside of the operation panel 26 so as to realize a desired operation. An LED (not shown) is fitted to the circuit board so as to emit light in response to a desired operation.

Additionally, the operation panel 26 is provided with a face plate 262 that is arranged to surround the operation buttons 261 so that light emitted from the LED is scattered through the face plate 262.

Two dials 311, 321, which constitute an operating section of a projection lens position adjusting mechanism 30 as a lens shifting mechanism (see FIG. 6), are exposed to the outside through the front surface side (the right side in FIG. 1) of the top surface section 21A. The projection lens position adjusting mechanism 30 is adapted to adjust the position of the projection lens 3 by shifting the projection lens 3 in the tilting direction of the projector 1 (the directions of Y3 and Y4 in FIG. 1) and in the direction perpendicular to the tilting direction. As the left side dial 311 in FIG. 1 of the two dials 311, 321 is moved in Y1 direction (downward), the projection lens 3 is moved in Y3 direction (downward). On the other hand, as the dial 311 is moved in Y2 direction (upward), the projection lens 3 is moved in Y4 direction (upward).

As the right side dial 321 in FIG. 1 is moved in X1 direction (rightward as viewed from the rear side of the projector 1), the projection lens 3 is moved in X3 direction (rightward). On the other hand, as the dial 321 is moved in X2 direction (leftward as viewed from the rear side of the projector 1), the projection lens 3 is moved in X4 direction (leftward).

Although not shown, a rib is arranged to surround the outer periphery of the projection lens 3 at the inner surface side of the top surface section 21A.

The lateral surface section 21C is provided with a notch 21C1 for exposing the louver 71 formed by combining a plurality of vanes 711 to the outside.

As shown in FIG. 3, the rear surface section 21D is provided with a notch 21D1 to be engaged with the rear case 25.

As shown in FIGS. 1 through 3, the lower case 22 includes a bottom surface section 22A, two lateral surface sections 22B, 22C, a rear surface section 22D and a front surface section 22E.

The bottom surface section 22A shows a substantially rectangular plan view, the bottom surface section 22A is provided substantially at the middle of the rear side of the projector 1 with a fixed leg section 22A1 and at the opposite ends of the frontal long side thereof with respective adjustable legs 27, 27.

Each of the adjustable legs 27, 27 has an axial member 271 (see FIG. 4) that can be driven to retractably and outwardly project from the bottom surface section 22A so that the inclination of the projector 1 can be adjusted vertically and transversally while it is being driven to project an image.

The bottom surface section 22A is also provided with an aperture 22A3 that holds the outside and the inside of the exterior case 2 in communication relative to each other. The aperture 22A3 operates as air intake port for taking cooling air into the exterior case 2 from the outside of the exterior case 2. A cover 22A5 provided with a plurality of openings is fitted to the aperture 22A3.

The lateral surface section 22B is made to stand up from the edge of one of the long side edges of the bottom surface section 22A. As shown in FIG. 2, the lateral surface section 22B is adapted to be engaged with the corresponding lateral surface section 21B of the upper case 21 to form a corresponding lateral surface of the exterior case 2.

The lateral surface section 22B is provided with a recessed section 22B1 recessed toward the upper case 21. The recessed section 22B1 serves as holding section when a user holds the projector 1 by hand.

As shown in FIG. 1, the lateral surface section 22C is made to stand up from the edge of the other long side of the bottom surface section 22A. The lateral surface section 22C is adapted to be engaged with the corresponding lateral surface section 21C of the upper case 21 to form part of a corresponding lateral surface of the exterior case 2. The lateral surface section 22C is notched to form a notch 22C1 to a large extent from the top end thereof to produce an aperture through which the louver 71 is exposed to the outside. To be more accurate, the notch 21C1 of the lateral surface section 21C and the notch 22C1 of the lateral surface section 22C form an aperture through which the louver 71 is exposed to the outside. Air is expelled from the opening after cooling the inside of the projector 1.

As shown in FIG. 3, the rear surface section 22D is made to stand up from the end of one of the short sides of the bottom surface section 22A. The rear surface section 22D is provided with a notch 22D1 to be engaged with the rear case 25. More specifically, in this embodiment, the rear surface sections 21D and 22D and the rear case 25 constitute the rear surface of the exterior case 2.

The rear surface section 22D is provided with a rectangular aperture 22D2. An inlet connector 22D3 is exposed to the outside through the aperture 22D2. The inlet connector 22D3 is a terminal to be used for supplying electric power to the projector 1 from an external power source. It is electrically connected to a power source unit, which will be described in detail hereinafter.

Referring back to FIG. 1, the front surface section 22E is made to stand up from the edge of the other short side of the bottom surface section 22A. The front surface section 22E is adapted to be engaged with the front case 23 to produce the front surface of the exterior case 2 with it.

As shown in FIGS. 1 and 2, the front case 23 shows a substantially elliptic contour and is provided with, at one of the opposite ends (the right side end in FIG. 1) of the major axis of the ellipse, an aperture 231 for exposing the projection lens 3 to the outside.

A remote-controlled light receiving window 232 is formed substantially at the center of the front case 23. A remote-controlled light receiving module (not shown) is arranged at the inside of the remote-controlled light receiving window 232 to receive operation signals from a remote controller (not shown).

It may be appreciated that the remote controller is provided with a start switch and an adjustment switch equivalent to those of the above-described operation panel 26 so that, as the remote controller is operated, an infrared signal representing the operation is output from the remote controller and received by a light receiving section by way of the remote-controlled light receiving window 232 so as to be processed by a control substrate, which will be described in more detail hereinafter.

As shown in FIGS. 1 and 3, the side case 24 includes a top surface section 24A and a lateral surface section 24C suspended substantially vertically from the top surface section 24A. The top surface section 24A is adapted to be engaged with the top surface section 21A of the upper case 21 to form the top surface of the exterior case 2.

The lateral surface section 24C is adapted to be engaged with the lateral surface section 21C of the upper case 21 and the lateral surface section 22C of the lower case 22.

As shown in FIG. 3, the rear case 25 is fitted into the aperture formed by the notch 21D1 of the rear surface section 21D of the upper case 21 and the notch 22D1 of the rear surface section 22D of the lower case 22 and rigidly secured there.

The rear case 25 shows a substantially rectangular plan view and is provided at a position near one of the longitudinal opposite ends thereof with a remote-controlled light receiving window 232 similar to that of the front case 23.

The rear case 25 is also provided with a recessed section 251 that is recessed toward the inside of the exterior case 2 and a plurality of connection terminals 252 are exposed to the outside at the recessed section 251.

The connection terminals 252 are adapted to receive image signals and audio signals from external electronic appliances. The connection terminals 252 are connected to an interface substrate arranged in the inside of the rear case 25.

The interface substrate is electrically connected to the control substrate, which will be described in more detail hereinafter. The signals processed by the interface substrate are output to the control substrate.

(2) Internal Configuration

Figure 4:
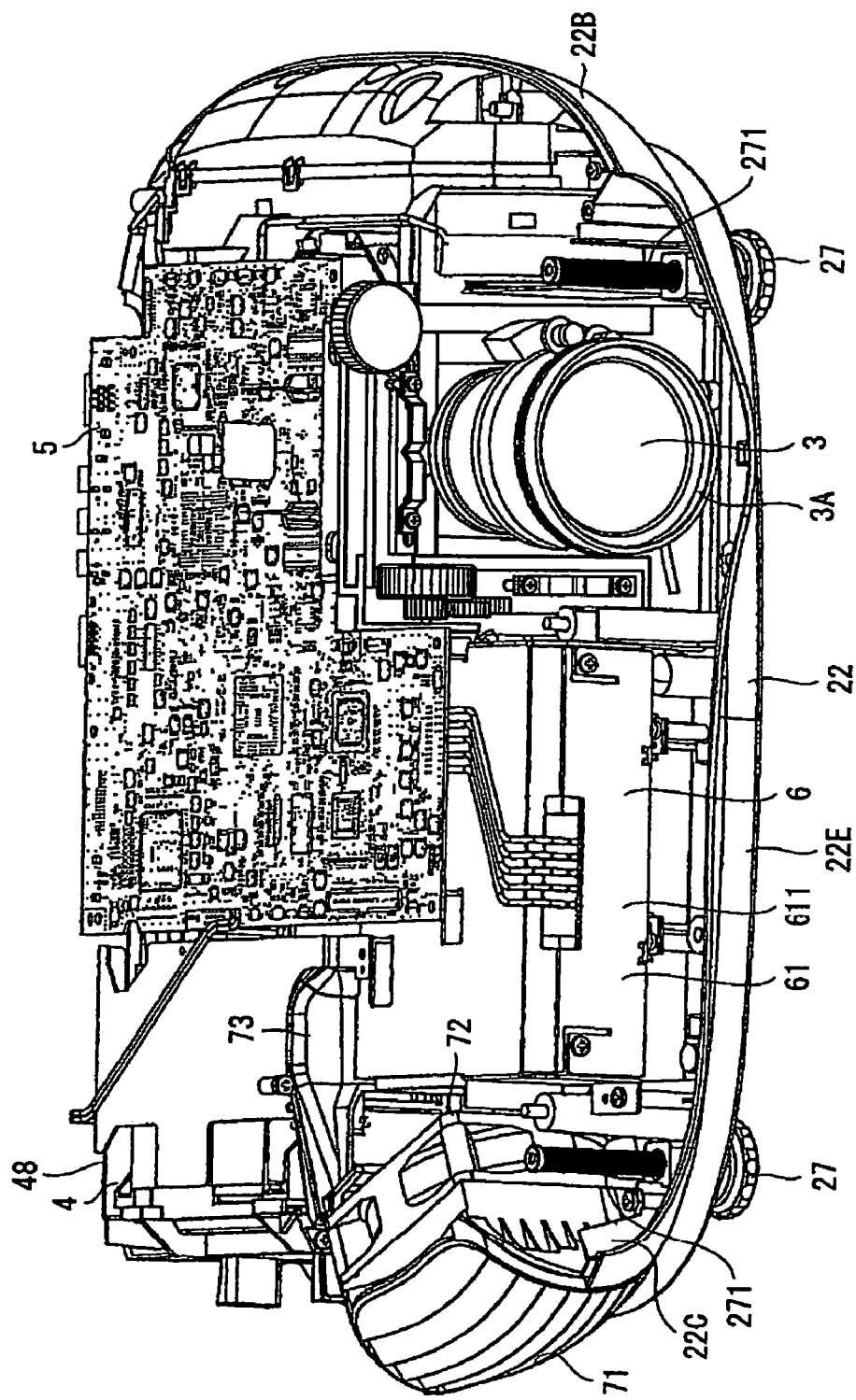
FIG. 4 is a perspective view of the internal configuration of the first embodiment of projector.

FIG. 4 shows the internal configuration of the projector 1. More specifically, FIG. 4 shows the inside of the projector 1 by removing the upper case 21, the front case 23, the side case 24 and the rear case 25 of the exterior case 2, only the lower case 22 being left in FIG. 4.

The projector main body of the projector 1 is contained in the inside of the exterior case 2. The projector main body includes an optical unit 4 that extends transversally along the longitudinal direction of the exterior case 2, a control substrate 5 arranged above the optical unit 4 and a power source unit 6.

(2-1) Structure of the Optical Unit 4

Figure 5:
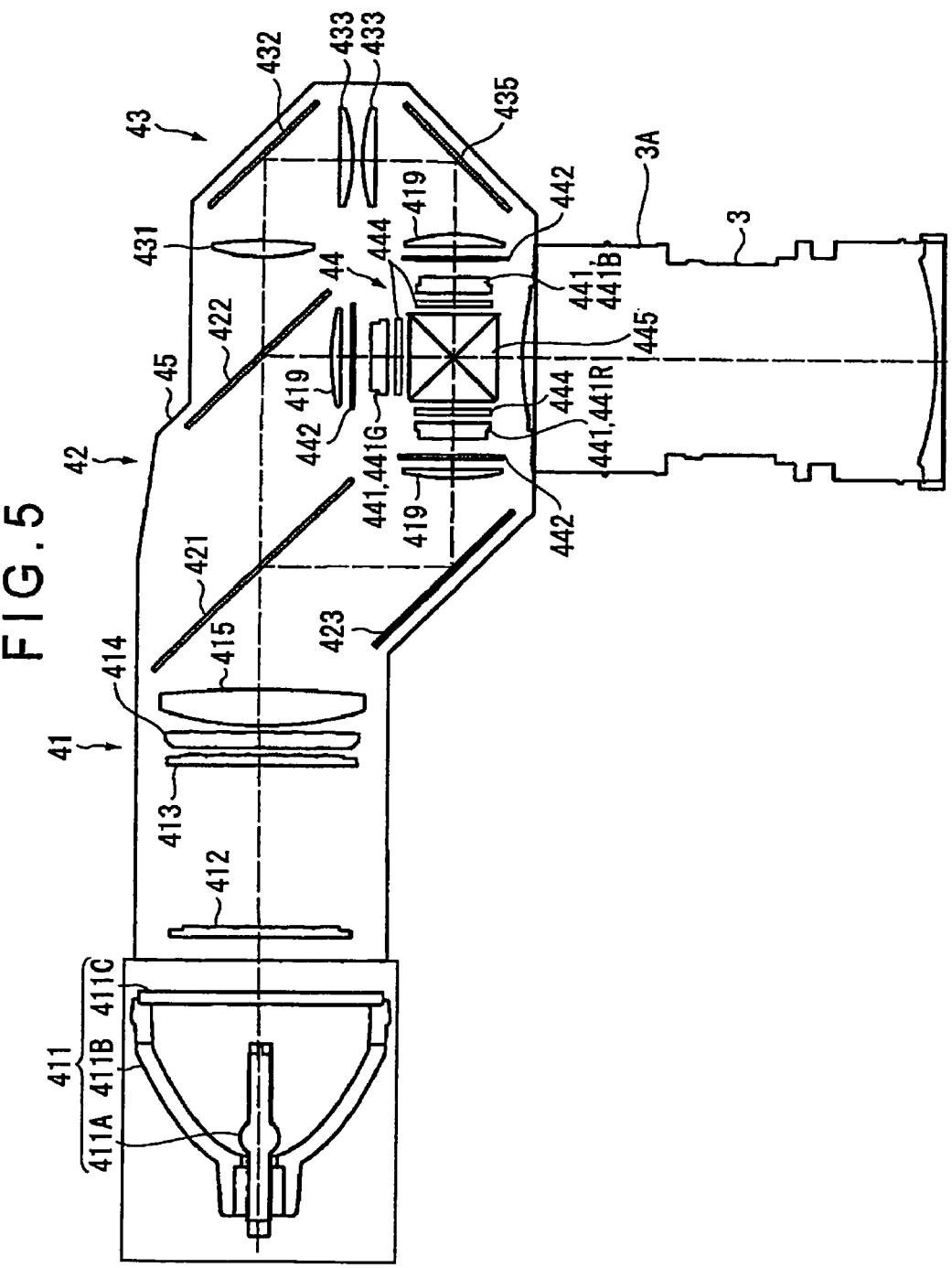
FIG. 5 is a schematic illustration of an optical unit of the first embodiment.

FIG. 5 is a schematic illustration of the optical unit 4, showing the configuration thereof.

The optical unit 4 is adapted to modulate the light beam emitted from a light source device according to image information and project an optical image onto a plane of projection such as a screen through the projection lens 3. As shown in FIG. 5, the optical unit 4 includes an integrator illuminating optical system 41, a color separating optical system 42, a relay optical system 43, an optical device 44 realized by integrally combining the optical modulator and the color separating optical system and a substantially rectangularly parallelepipedic casing 45 for containing the optical components 41, 42, 43, 44 (see FIG. 6).

The integrator illuminating optical system 41 is an optical system for uniformizing the illuminance of the light beam emitted from the light source in an orthogonal plane relative to the axis of the illumination light beam. The integrator illuminating optical system 41 includes a light source device 411, a first lens array 412, a second lens array 413, a polarization converter 414 and a superimposing lens 415.

The light source device 411 includes a light source lamp 411A for irradiating light, a reflector 411B and an explosion-proof glass 411C for covering the light beam emitting surface of the reflector 411B. The radiated light beam emitted from the light source lamp 411A is reflected by the reflector 411B to become a light beam of substantially collimated rays, which is then emitted to the outside. In this embodiment, a high pressure mercury lamp is adopted for the light source lamp 411A and a paraboloidal mirror is adopted for the reflector 411B.

The light source lamp 411A is, however, not limited to a high pressure mercury lamp and it may alternatively be a metal halide lamp or a halogen lamp. Similarly, while a paraboloidal mirror is adopted for the reflector 411B, the present invention is by no means limited to a paraboloidal mirror and, for example, an arrangement using an ellipsoidal mirror and a collimating concave lens arranged at the light emitting surface of the reflector may alternatively be used for the purpose of the present invention.

The first lens array 412 is formed by arranging small lenses, each having a substantially rectangular contour as viewed in the axial direction of the illumination light beam, in the form of a matrix. The small lenses are adapted to divide the light beam emitted from the light source lamp 411A into partial light beams and emit them in the axial direction of the illumination light beam.

The second lens array 413 have a configuration substantially same as that of the first lens array 412. In other words, it is formed by arranging small lenses in the form of a matrix. The second lens array 413 has a function of cooperating with the superimposing lens 415 to focus the images of the small lenses of the first lens array 412 on the liquid crystal panels 441R, 441G, 441B, which will be described in more detail hereinafter, of the optical device 44.

The polarization converter 414 is adapted to convert light from the second lens array 413 into polarized light of a substantially single type. The efficiency of utilization of light in the optical device 44 is improved due to the operation of the polarization converter 414.

More specifically, the partial light beams converted into polarized beams of light of a substantially single type by the polarization converter 414 are substantially superimposed one on the other by the superimposing lens 415 on the liquid crystal panels 441R, 441G, 441B, which will be described in more detail hereinafter, of the optical device 44. Since a projector including liquid crystal panels 441R, 441G, 441B that are adapted to modulate polarized light can use polarized light of a single type, it can utilize only about a half of the light beam emitted from the light source lamp 411A that is adapted to emit randomly polarized light. Thus, the efficiency of utilization of light of the optical device 44 is raised as a result of converting the light beam emitted from the light source lamp 411A into polarized light of a substantially single type. Such a polarization converter 414 is described, for example, in Japanese Patent Laid-Open Publication No. Hei. 8-304739.

The color separating optical system 42 includes two dichroic mirrors 421, 422 and a reflection mirror 423. The partial light beams emitted from the integrator illuminating optical system 41 are separated into light beams of three colors of red (R), green (G) and blue (B) by the two dichroic mirrors 421, 422.

The relay optical system 43 includes an incident-side lens 431, a pair of relay lenses 433 and reflection mirrors 432, 435. The relay optical system 43 has a function of leading blue light separated by the color separating optical system 42 down to the liquid crystal panel 441B, which will be described in more detail hereinafter, of the optical device 44.

At this time, the dichroic mirror 421 of the color separating optical system 42 transmits the green light beams and the blue light beams and reflects the red light beams of all the light beams emitted from the integrator illuminating optical system 41. Red light reflected by the dichroic mirror 421 is reflected again by the reflection mirror 423 to get to the liquid crystal panel 441R for red light by way of a corresponding field lens 419. The field lens 419 converts the partial light beams emitted from the second lens array 413 into light beams that are collimated in a direction parallel to their central axis (main optical axis). The field lenses 419 arranged at the light incident-sides of the respective liquid crystal panels 441G, 441B also operate in the same way.

Of blue light and green light transmitted through the dichroic mirror 421, green light is reflected by the dichroic mirror 422 to get to the liquid crystal panel 441G for green light by way of the corresponding field lens 419. On the other hand, blue light is transmitted through the dichroic mirror 422, the relay optical system 43 and the corresponding field lens 419 to get to the liquid crystal panel 441B for blue light.

The relay optical system 43 is used for blue light in order to prevent the efficiency of utilization of light from falling due to scattering of light because the optical path of blue light is longer than the optical path of red light and that of green light. In other words, the relay optical system 43 is provided in order to transmit the partial light beams that enter the incident-side lens 431. While the relay optical system 43 is adapted to transmit blue light out of light beams of the three colors in this embodiment, the present invention is by no means limited thereto and it may alternatively be so adapted as to transmit red light.

The optical device 44 modulates the incident light beam according to image information and forms a color image. The optical device 44 includes three incident-side polarization plates 442 for receiving the color light beams produced by the color separating optical system 42 as a result of the process of separating the color light beams of the system 42, liquid crystal panels 441 (441R, 441G, 441B), which constitute an optical modulator, and irradiation-side polarization plates 444, the liquid crystal panels 441 and the irradiation-side polarization plates 444 being arranged downstream relative to the respective incident-side polarization plates 442, and a cross dichroic prism 445 as a color combining optical device.

The liquid crystal panels 441R, 441G, 441B are typically formed by using a polysilicon TFT as a switching element. Each of the liquid crystal panels 441R, 441G, 441B is formed by putting liquid crystal into the gap between a pair of oppositely disposed transparent sub es so as to be held there in a hermetically sealed state and adapted to modulate the incident light beam entering it by way of the incident-side polarization plate 442 according to image information and emit the modulated light beam.

Each of the irradiation-side polarization plates 442 is adapted to transmit only light polarized in a predetermined direction out of the light beam of the corresponding color separated by the color separating optical system 42 and absorb light polarized in any other directions. It is formed by bonding a polarization film to a substrate that is typically made of sapphire glass.

Each of the irradiation-side polarization plates 444 has a configuration similar to that of the incident-side polarization plates 442 and is adapted to transmit only light polarized in a predetermined direction out of the light beam of the corresponding color emitted from the corresponding one of the liquid crystal panels 441R, 441G, 441B. The axis of polarization of polarized light it transmits is arranged orthogonal relative to the axis of polarization of polarized light that the incident-side polarization plate 442.

The cross dichroic prism 445 is designed to synthetically combine the optical images emitted respectively from the irradiation-side polarization plates 444 and modulated for the different three colors. The cross dichroic prism 445 contains a dielectric multilayer film adapted to reflect red light and a dielectric multilayer film adapted to reflect blue light that are arranged along the interfaces of four rectangular prisms so as to substantially draw a letter of X. Light of the three colors is synthetically produced by means of the dielectric multilayer films.

The liquid crystal panels 441R, 441G, 441B, the irradiation-side polarization plates 444 and the cross dichroic prism 445 described above are arranged integrally to form a unit and mounted in a head body 7, which will be described in more detail hereinafter.

Figure 6:
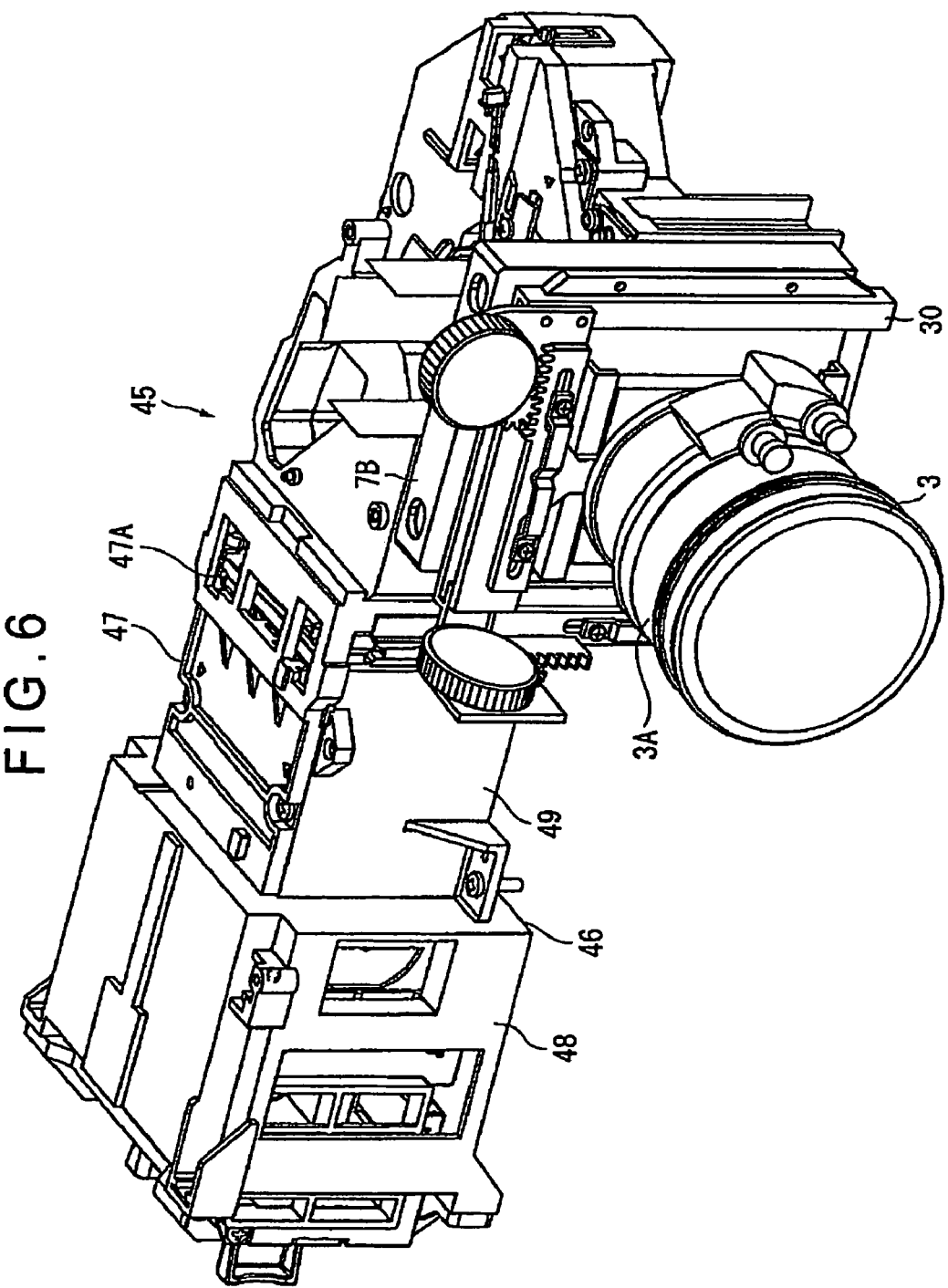
FIG. 6 is a schematic perspective view of a casing for containing optical components of the first embodiment.

FIG. 6 is a perspective view of the casing 45 for containing optical components, illustrating the configuration thereof.

The casing 45 for containing optical components is typically made of synthetic resin and formed by injection. It includes a components containing member 46 for containing the above-described optical components 41, 42, 43, 44 and a closure member 47 for closing the top opening of the components containing member 46.

The components containing member 46 by turn includes a light source containing section 48 for containing the light source device 411 and a components containing section 49 showing a container-like profile and adapted to contain the optical components other than the light source device 411.

The light source containing section 48 shows a substantially box-like profile and, although not illustrated in detail, has an aperture formed at the side thereof located close to the components containing section 49 and another aperture formed at the opposite side thereof. The aperture formed at the side of the light source containing section 48 located close to the components containing section 49 is adapted to allow the light beam emitted from the light source device 411 to pass through it. The aperture formed at the opposite side of the light source containing section 48 is adapted to receive the light source device 411 so as to put it into it through that lateral side.

The components containing section 49 show a substantially rectangularly parallelepipedic profile with an open top side. It is connected at a side thereof to the light source containing section 48. Although not illustrated in detail, the components containing section 49 is provided with a plurality of vertical grooves for allowing the optical components 412 through 415, 419, 421 through 423, 431 through 435 to slide down along them from above and contain them in the inside. The head body 7 (see FIG. 12) that constitutes a unit along with the above-described liquid crystal panels 441 and the cross dichroic prism 445 is arranged at the opposite side of the components containing section 49.

The structure of the projection lens position adjusting mechanism 30 and that of the head body 7 will be described in more detail hereinafter.

The closure member 47 closes the top opening of the components containing section 49 of the components containing member 46 except an area thereof located above the optical device 44. The closure member 47 is provided with a plurality of openings 47A running through it so as to allow cooling air to be expelled after cooling the inside of the casing 45 for containing optical components.

(2-2) Structure of the Control Substrate 5

As shown in FIG. 4, the control substrate 5 is arranged above the closure member 47 of the casing 45 for containing optical components. The control substrate 5 is realized as a circuit board where processing devices including a CPU (Central Processing Unit) are mounted and adapted to control the entire projector 1. The control substrate 5 drives the liquid crystal panels 441R, 441G, 441B and controls their operations according to the signals output from the above-described interface substrate. Thus, the liquid crystal panels 441R, 441G, 441B modulate light and produce an optical image under the control of the control substrate 5. Additionally, the control substrate 5 receives the operation signals output from the circuit board of the above-described operation panel 26 and the above-described remote-controlled light receiving module (not shown) and appropriately outputs control commands to the components of the projector 1 according to the operation signals.

(2-3) Structure of the Power Source Unit 6

The power source unit 6 supplies electric power to the light source device 411, the control substrate 5 and other components of the projector 1. It is arranged in the longitudinal direction of the front case 23 of the exterior case 2. The power source unit 6 includes a power source block 61 having a power supply circuit and a lamp drive block (not shown) arranged below the power source block 61.

The power source block 61 is adapted to supply electric power that is supplied from the outside by way of a power supply cable connected to the inlet connector 22D3 to the lamp drive block and the control substrate 5 as well as to other related components. The power source block 61 by turn includes a transformer for converting the AC that is input to it into a low voltage DC, a circuit board that carries a conversion circuit for converting the output of the transformer to a predetermined voltage and is mounted on one of the surfaces thereof and a sleeve member 611 that operates as shield member for covering the circuit board. The sleeve member 611 is made of aluminum and shows a substantially box-shaped profile with a pair of open opposite ends.

The lamp drive block is a conversion circuit for supplying electric power to the above-described light source device 411 with a stabilized voltage. The commercial AC that is input from the power source block 61 is rectified and converted into a DC and an AC showing a rectangular waveform by this lamp drive block before it is supplied to the light source device 411.

An exhaust fan 72 is arranged at a side of the power source unit 6 so as to blow out cooling air through the opening where the louver 71 is fitted after cooling the power source unit 6. A duct 73 is arranged between the power source unit 6 and the light source containing section 48 of the casing 45 for containing optical components so that cooling air is drawn by the exhaust fan 72 and driven out through the opening by way of the duct 73 after cooling the light source device 411 in the light source containing section 48.

(3) Projection Lens Position Adjusting Mechanism 30

Figure 7:
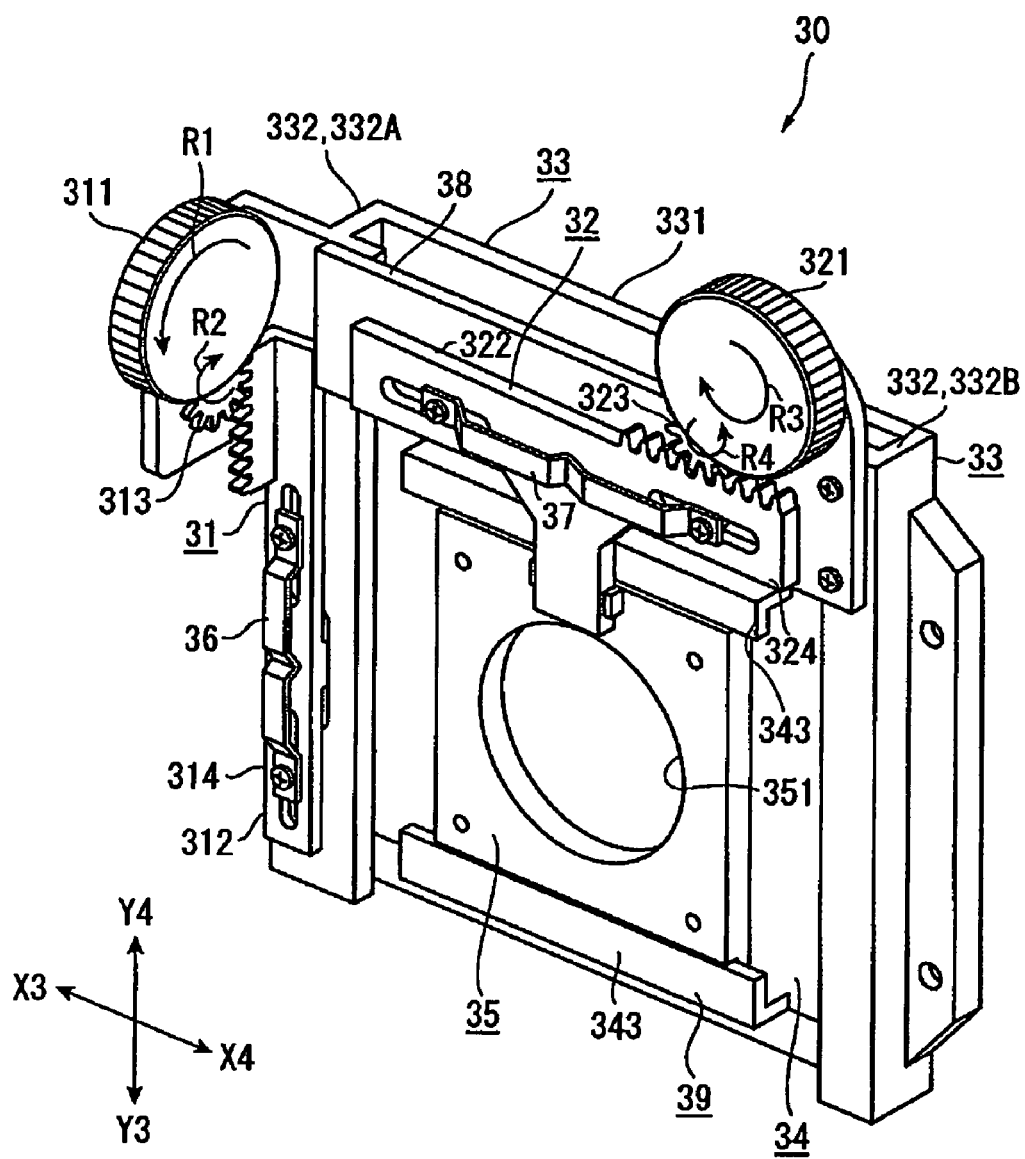
FIG. 7 is a schematic perspective view of a projection lens position adjusting mechanism of the first embodiment.

FIG. 7 is a schematic perspective view of the projection lens position adjusting mechanism 30.

The projection lens position adjusting mechanism 30 is adapted to adjust the light projecting position of the projection lens 3 by shifting the projection lens 3 in the tilting direction (the directions of Y3 and Y4 in FIG. 1) and in the direction perpendicular to the tilting direction (the directions of X3 and X4 in FIG. 1). It is possible to project an optical image shifted upwardly from the reference position (that is located substantially at the center of the movable range of the projection lens 3 as viewed both along the X-axis and along the Y-axis) of the optical axis of the projection lens 3 according to the extent of the positional shift of the projection lens 3 when the projection lens 3 is shifted in the direction of Y4 by means of the projection lens position adjusting mechanism 30. Similarly, it is possible to project an optical image shifted downwardly from the reference position of the optical axis of the projection lens 3 according to the extent of the positional shift of the projection lens 3 when the projection lens 3 is shifted in the direction of Y3 by means of the projection lens position adjusting mechanism 30.

Likewise, it is also possible to project an optical image shifted in the direction of X3 or X4 from the reference position of the optical axis of the projection lens 3 according to the extent of the positional shift of the projection lens 3 when the projection lens 3 is shifted in the direction of X3 or X4, whichever appropriate, by means of the projection lens position adjusting mechanism 30.

Figure 8:
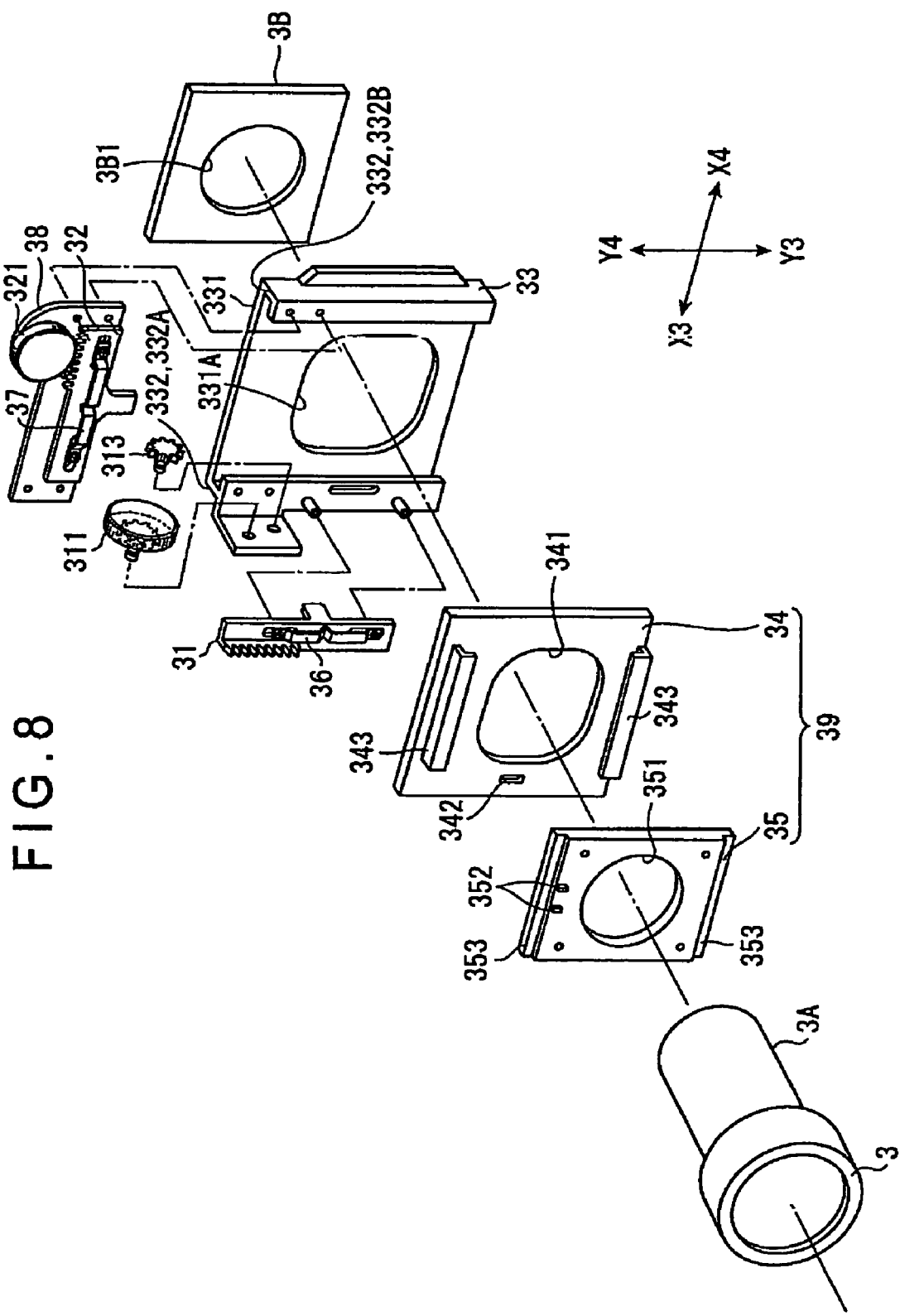
FIG. 8 is an exploded perspective view of the projection lens position adjusting mechanism of the first embodiment.

FIG. 8 is an exploded perspective view of the projection lens position adjusting mechanism 30.

The projection lens position adjusting mechanism 30 includes a base section 33 rigidly secured to the head body 7 (see FIG. 12), which will be described in more detail hereinafter, a seat 39 constituted by a Y-table 34 and an X-table 35 adapted to slide on the base section 33, a Y-table drive mechanism 31 for driving the Y-table 34 of the seat 39 to slide on the base section 33 and an X-table drive mechanism 32 for driving the X-table 35 of the seat 39 to side on the base section 33.

Figure 9:
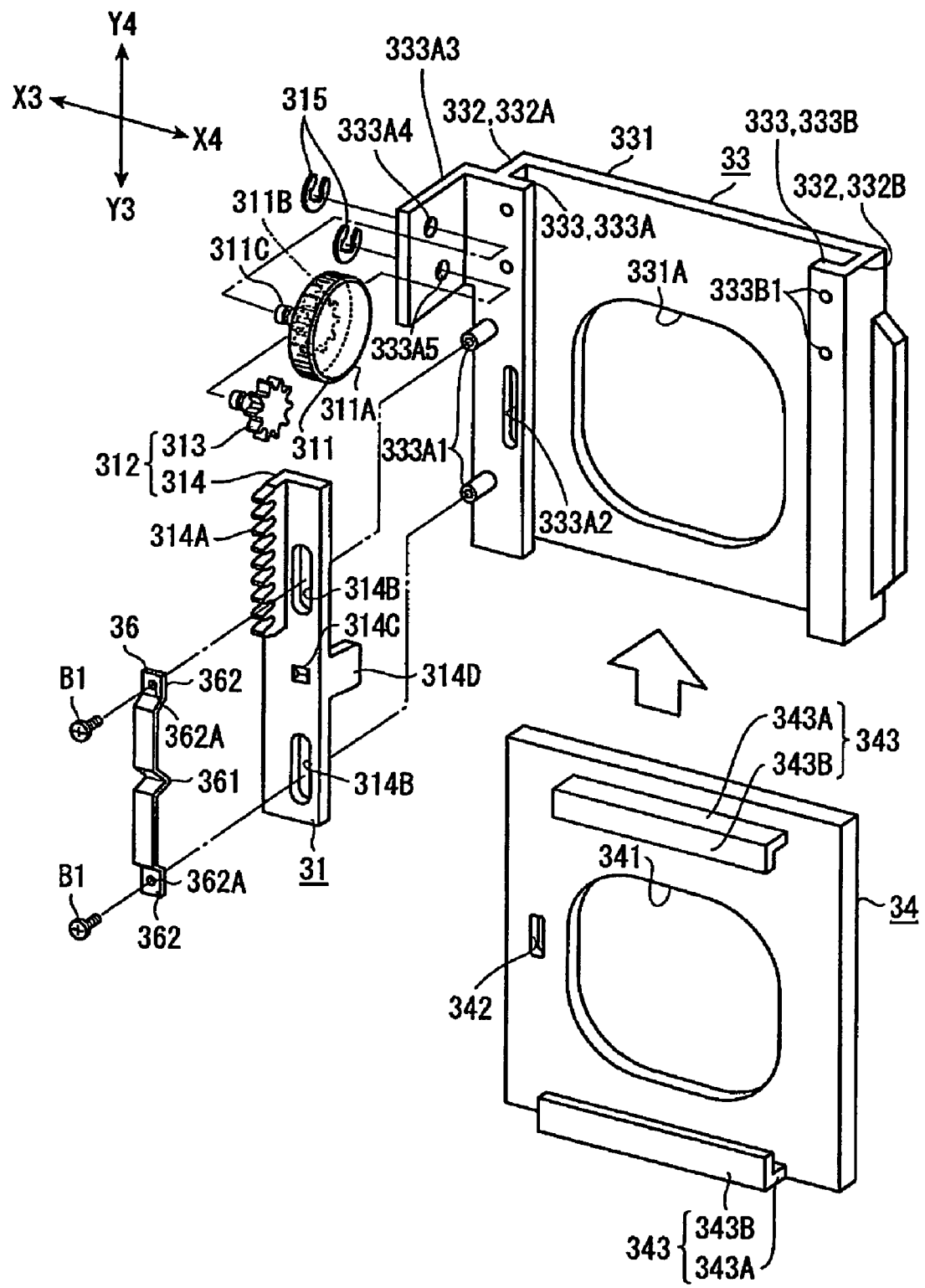
FIG. 9 is an exploded perspective view of a principal part of the projection lens position adjusting mechanism of the first embodiment.

FIG. 9 is a schematic perspective view of the base section 33 and the Y-table 34.

As shown in FIGS. 8 and 9, the base section 33 includes a plate-like main body section 331 that is substantially rectangular in plan view and extending sections 332 extending rectangularly toward the side of the Y-table 34 from oppositely disposed respective ends of the main body section 331.

The main body section 331 is provided at a substantially central part thereof with a substantially square hole 331A for receiving the projection lens 3 so as to allow the projection lens 3 to move through it. The movable range of the projection lens 3 is defined by the hole 331A.

The front end sections 333 of the extending sections 332 run substantially in parallel with the main body section 331. A pair of oppositely disposed ends of the Y-table 34 that are running along the X-axis are inserted in the respective gaps defined by the front end sections 333 and the main body section 331.

One of the extending sections 332, or the extending section 332A shows a substantially T-shaped cross section and a pair of bosses 333A1 are formed at front end section 333A of the extending section 332A. The paired bosses 333A1 are introduced into respective oblong holes 314B of Y-slider 314 of the Y-table drive mechanism 31, which will be described in more detail hereinafter. Additionally, an oblong hole 333A2 that extends in the direction of the Y-axis is cut through the front end section 333A of the extending section 332A.

Still additionally, a fitting piece 333A3 is formed at the top end of the front end section 333A so as to extend substantially rectangularly relative to the front end section 333A. Two holes 333A4, 333A5 are bored through the fitting piece 333A3 in order to rigidly hold a dial 311 and gear 313 of the Y-table drive mechanism 31, which will be described in more detail hereinafter.

Of the extending section 332, the other extending section 332B shows a substantially L-shaped cross section and holes 333B1 are bored through front end section 333B thereof in order to securely hold fitting section 38 to which the X-table drive mechanism 32 is to be fitted. The X-table drive mechanism 32 will also be described in more detail hereinafter.

Figure 10:
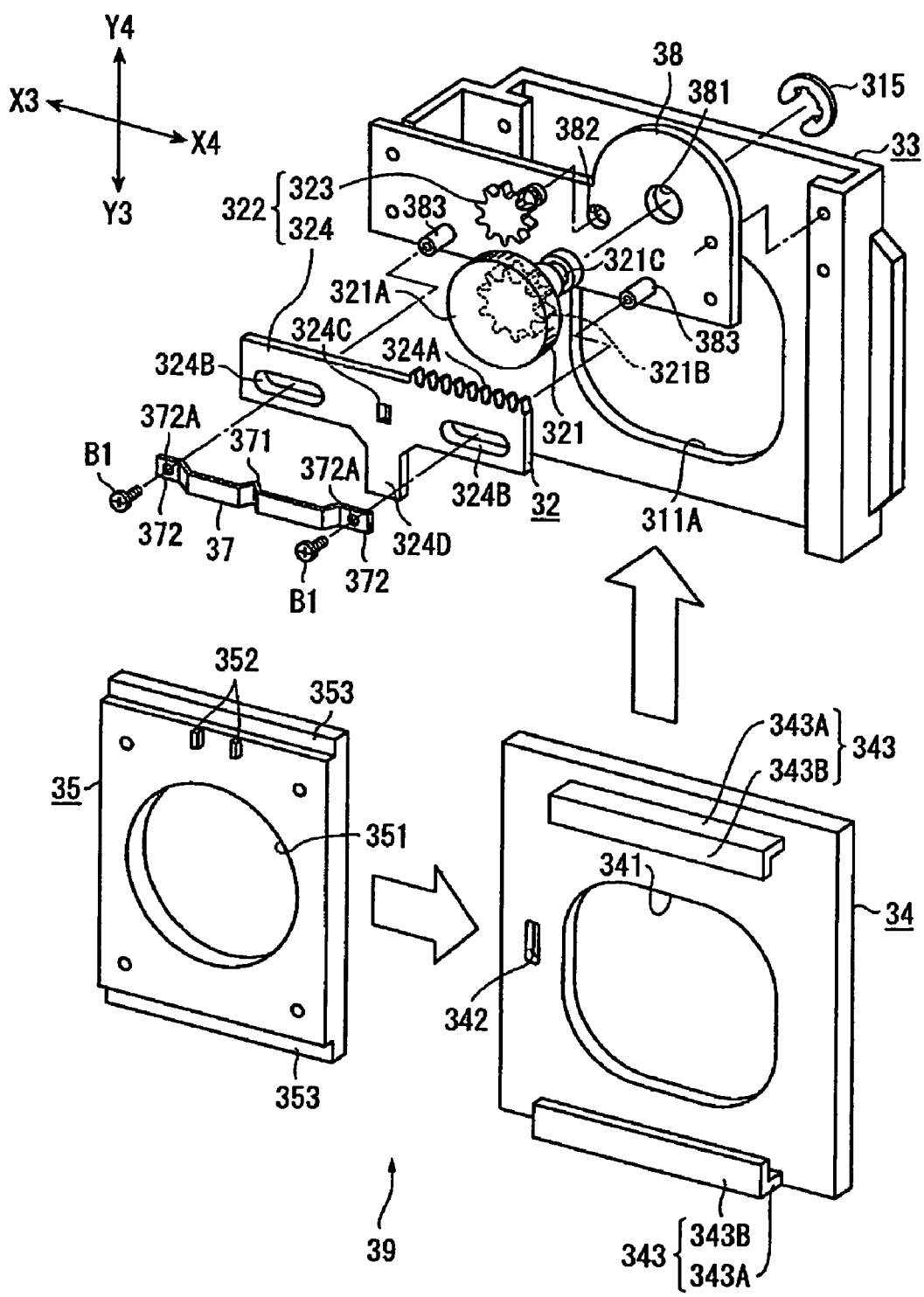
FIG. 10 is another exploded perspective view of a principal part of the projection lens position adjusting mechanism of the first embodiment.

FIG. 10 is a schematic perspective view of the base section 33 and the seat 39.

The seat 39 is constituted by the Y-table 34 adapted to slide on the base section 33 in the direction of the Y-axis and an X-table 35 adapted to slide on the base section 33 in a direction perpendicular to the Y-axis (in the direction of the X-axis).

As shown in FIGS. 9 and 10, the Y-table 34 is a plate-shaped member showing a substantially rectangular profile whose outer dimensions are smaller than those of the base section 33. The opposite ends of the Y-table 34 disposed in the direction of the X-axis are placed in the respective gaps formed by the front end sections 333 and the main body section 331 of the base section 33. Thus, the Y-table 34 it is adapted to slide in the direction of the Y-axis as it is guided by the main body section 331 and the front end sections 333.

An oblong elliptic hole 341 is formed substantially at the center of the Y-table 34 so as to extend in the direction of the X-axis. The length of the minor axis (running in the direction of the Y-axis) of the hole 341 is substantially equal to the diameter of the projection lens 3, while the length of the major axis (running in the direction of the X-axis) of the hole 341 is substantially equal to the length of the hole 331A of the base section 33 as viewed in the direction of the X-axis. The projection lens 3 is introduced into the hole 341.

A substantially rectangular hole 342 is formed near the end of the Y-table 34 in the direction of X3 and adjacent to the hole 341. The hole 342 is provided to rigidly secure the Y-slider 314 to the Y-table 34.

A pair of pieces 343 is fitted to the opposite ends of the Y-table 34 in the direction of the Y-axis with the hole 341 interposed between them. Each of the paired pieces 343 shows a substantially L-shaped cross section and includes a perpendicular section 343A that is perpendicular to the Y-table 34 and a parallel section 343B extending from the perpendicular section 343A substantially in parallel with the Y-table 34. The gap between the parallel section 343B and the Y-table 34 is adapted to receive the corresponding end of the X-table 35.

As shown in FIG. 10, the X-table 35 is a plate-shaped member showing a substantially rectangular profile. The outer dimensions of the X-table 35 are smaller than those of the Y-table 34.

A substantially circular hole 351 is formed substantially at the center of the X-table 35. The diameter of the hole 351 is substantially equal to the outer diameter of the projection lens 3 and adapted to receive the projection lens 3 so as to allow the lens 3 to pass through it. A pair of projections 352 is formed on the X-table 35 and separated from the hole 351 in the direction of Y4. The opposite ends 353 of the X-table 35 that run in the direction of the Y-axis are partly cut so as to make them show a thickness smaller than the remaining part of the X-table 35. The narrowed ends 353 of the X-table 35 are adapted to be introduced into the respective gaps between the Y-table 34 and the oppositely disposed pieces 343 in such a way that they may slide on the respective pieces 343. In other words, the X-table 35 can slide on the base section 33 by way of the Y-table 34.

As shown in FIG. 9, the Y-table drive mechanism 31 is adapted to linearly drive the Y-table 34 in the direction of the Y-axis on the base section 33. It has a dial 311 and a transmitting section 312 for transmitting the rotary motion of the dial 311 to the Y-table 34.

The dial 311 includes a dial main body 311A that shows a substantially cylindrical profile and is exposed to the outside through a dial exposing hole (see FIG. 1) bored through the top surface section 21A of the upper case 21 of the exterior case 2, a gear section 311B fitted to the circular surface of the dial main body 311A and a shaft section 311C fitted to the gear section 311B.

The shaft section 311C is put into the hole 333A4 bored through the fitting piece 333A3 of the base section 33 and rigidly anchored in position by a substantially C-shaped anchor ring 315.

The transmitting section 312 includes a gear 313 to be engaged with the gear section 311B of the dial 311 and a Y-slider 314 to be engaged with the gear 313 so as to be driven to slide as the gear 313 is rotated.

The gear 313 has a shaft that is put into the hole 333A5 of the fitting piece 333A3 of the base section 33 and rigidly anchored in position by another anchor ring 315.

The Y-slider 314 is an oblong member extending in the direction of the Y-axis and has an end part located at one of the short sides thereof that is bent in the direction opposite to the base section 33. This part is notched to show a profile like that of saw teeth. It operates as an engaging section 314A to be meshed with the gear 313. The Y-slider 314 is provided with a pair of oblong holes 314B extending in the longitudinal direction thereof and a recess 314C. The oblong holes 314B are adapted to receive the respective bosses 333A1 of the base section 33. The recess 314C is arranged substantially at the middle of the paired oblong holes 314B and shows a V-shaped cross section.

A projection 314D is formed substantially at the center of the surface of the Y-slider 314 that is located vis-à-vis the base section 33 so as to project away from the surface. This projection 314D is adapted to be put into the hole 342 of the Y-table 34 and further into the oblong hole 333A2 of the base section 33.

An oblong spring piece 36 is fitted to the Y-slider 314 so as to extend in the direction of the Y-axis. The spring piece 36 biases the Y-slider 314 toward the base section 33 and allows the Y-slider 314 to freely slide.

The longitudinal opposite end sections 362 of the spring piece 36 are bent to show a substantially L-shaped profile. Holes 362A are bored through the respective end sections 362. In the holes 362A, screws B1 are respectively driven into the bosses 333A1 by way of the oblong holes 314B.

The spring piece 36 is bent at a substantially longitudinal middle part thereof so as to show a V-shaped profile. In other words, a projection 361 is formed there to project toward the Y-slider 314. The projection 361 is biased toward the Y-slider 314 so as to abut the Y-slider 314. Thus, as the Y-slider 314 slides and the optical axis of the projection lens 3 is driven to move to the reference position, or the substantially central position of its moving range in the direction of the Y-axis, the projection 361 comes into engagement with the recess 314C of the Y-slider 314. Then, as a result, the user can recognize that the optical axis of the projection lens 3 is shifted to the reference position (the substantially central position of the moving range of the Y-slider) in the direction of the Y-axis.

The X-table drive mechanism 32 is adapted to linearly drive the X-table 35 in the direction of the X-axis on the base section 33. As shown in FIG. 10, it has a dial 321 and a transmitting section 322 for transmitting the rotary motion of the dial 321 to the X-table 35.

The dial 321 has a structure similar to that of the dial 311. It includes a dial main body 321A that shows a substantially cylindrical profile and is exposed to the outside through a dial exposing hole bored through the top surface section 21A of the upper case 21, a gear section 321B fitted to the circular surface of the dial main body 321A and a shaft section 321C fitted to the gear section 321B.

The dial 321 is rigidly secured to the base section 33 by way of a plate-shaped fitting section 38. More specifically, the dial 321 is rigidly secured as the shaft section 321C thereof is put into the hole 381 and the substantially C-shaped anchor ring 315 is fitted in position. Note that the fitting section 38 is additionally provided with a hole 382 that is arranged adjacently relative to the hole 381 in order to receive the shaft section of the gear 323.

The transmitting section 322 includes a gear 323 to be engaged with the gear section 321B of the dial 321 and an X-slider 324 to be engaged with the gear 323 so as to be driven to slide in the direction of the X-axis as the gear 323 is rotated.

The X-slider 324 is a plate-shaped oblong member extending in the direction of the X-axis and has an end part located in the direction of Y4 and also in the direction of X4 that is notched to show a profile like that of saw teeth. It operates as an engaging section 324A to be meshed with the gear 313.

The X-slider 324 is provided with a pair of oblong holes 324B extending in the longitudinal direction thereof and a recess 324C.

The oblong holes 324B are adapted to receive respective bosses 383 formed in the fitting section 38.

The recess 324C is arranged substantially at the middle of the X-slider 324 so as to be interposed between the paired oblong holes 324B and shows a V-shaped cross section.

The X-slider 324 is provided substantially at the middle point thereof as viewed in the direction of the X-axis with an extending section 324D extending in the direction of Y3 in FIG. 10. The extending section 324D is introduced into the space between the paired projections 352 of the X-table 35.

Since the X-table 35 is adapted to be arranged on the Y-table 34, it is moved downward when the Y-table 34 is driven to move downward. Then, the extending section 324D of the X-slider 324 slides between the projections 352. It should be noted that the extending section 324D has such a large length that it does not come out of the space between the projections 352 even when the X-table 35 is moved to its lowest position. In other words, the length of the extending section 324D is greater than the length of the vertical movable range of the X-slider 324.

An oblong spring piece 37 is fitted to the X-slider 324 so as to extend in the direction of the X-axis. The spring piece 37 has a profile similar to that of the spring piece 36. More specifically, the longitudinal opposite end sections 372 of the spring piece 37 are bent to show a substantially L-shaped profile. Holes 372A are bored through the respective end sections 372. Screws B1 are respectively driven into the bosses 383 formed in the fitting section 38 by way of the oblong holes 324B. Thus, the spring piece 37 is rigidly secured to the fitting section 38 that is by turn rigidly fitted to the base section 33.

The spring piece 37 is bent at a substantially longitudinal middle part thereof so as to show a V-shaped profile. In other words, a projection 371 is formed there to project toward the X-slider 324. The projection 371 is biased toward the X-slider 324 so as to abut the slider 324 to the fitting section 38 side. Thus, as the X-slider 324 slides and the optical axis of the projection lens 3 is driven to move to the reference position, or the substantially central position of its moving range in the direction of the X-axis, the projection 371 comes into engagement with the recess 324C of the X-slider 324. Then, as a result, the user can recognize that the optical axis of the projection lens 3 is shifted to the reference position (the substantially central position of the moving range of the X-slider) in the direction of the X-axis.

As pointed out earlier, the projection lens 3 includes a plurality of lenses and a lens holding barrel 3A for containing the plurality of lenses in the inside. As shown in FIG. 8, the lens holding barrel 3A is made to pass through the hole 351 of the X-table 35, the hole 341 of the Y-table 34 and the hole 331A of the base section 33 so that it is shifted both in the direction of the X-axis and in the direction of the Y-axis as the X-table 35 and the Y-table 34 are driven to move in the respective directions. A flange 3B for making the head body 7 support the projection lens 3 is fitted to the end of the lens holding barrel 3A through which an incident light beam enters the lens holding barrel 3A.

Now, the operation of adjusting the position of the projection lens 3 by the projection lens position adjusting mechanism 30 will be described below.

Firstly, the movement of the projection lens 3 in the direction of the Y-axis will be described on an assumption that the projection lens 3 is located at the uppermost position of the movable range thereof in the direction of the Y-axis.

As the user turns the part of the dial 311 exposed to the outside from the exterior case 2 downward (in the direction of Y1 in FIG. 1), (then the dial 311 turns in the direction of R1 in FIG. 7). As the dial 311 is turned, the gear 313 is also turned in the direction of R2 in FIG. 7. As the gear 313 is turned, the Y-slider 314 is driven to move downward (in the direction of Y3). As a result, the bosses 333A1 are driven to slide in the respective oblong holes 314B of the Y-slider 314.

Additionally, the projection 314D of the Y-slider 314 is driven to slide in the oblong hole 333A2 of the base section 33.

Since the projection 314D is put into the hole 342 of the Y-table 34, the Y-table 34 also moves downward (in the direction of Y3) as the Y-slider 314 is driven to move. Since the vertical opposite ends of the X-table 35 are put into the respective gaps formed by the pieces 343 of the Y-table 34, the X-table 35 also moves downward as the Y-table 34 is driven to move. Since the projection lens 3 is put into the hole 351 of the X-table 35, the projection lens 3 also moves downward (in the direction of Y3) as a result.

Since the spring piece 36 is rigidly secured to the base section 33, it does not move while the Y-slider 314 is driven to move. Since the projection 361 of the spring piece 36 is biased toward the Y-slider 314 so as to abut the latter, the Y-slider 314 receives resistance to a certain extent from the projection 361 of the spring piece 36 when it moves in the direction of the Y-axis.

As the dial 311 is turned further until the projection lens 3 is moved substantially to the middle point of the hole 331A of the base 33 as viewed in the direction of the Y-axis, the projection 361 of the spring piece 36 comes into engagement with the recess 314C of the Y-slider 314. As a result, the user senses a feeling of a click and hence can recognize that the optical axis of the projection lens 3 is shifted to the reference position in the direction of the Y-axis.

As the dial 311 is turned further, the projection 361 of the spring piece 36 is disengaged from the recess 314C of the Y-slider 314 so that the projection 361 and the Y-slider 314 resist against each other once again.

Now, the movement of the projection lens 3 in the direction of the X-axis will be described on an assumption that the projection lens 3 is located at the rightmost position of the movable range thereof in the direction of the X-axis as the projection 1 is viewed from behind.

As the user turns the part of the dial 321 exposed to the outside from the exterior case 2 leftward (in the direction of X2 in FIG. 1) as viewed from the rear side of the projector 1, (then the dial 321 turns in the direction of R3 in FIG. 7). As the dial 321 is turned, the gear 323 is also turned in the direction of R4 in FIG. 7. As the gear 323 is turned, the X-slider 324 is driven to move leftward (in the direction of X4) as viewed from the rear side of the projector 1, As a result, the bosses 383 are driven to slide in the respective oblong holes 324B of the X-slider 324.

Since the extending section 324D of the X-slider 324 is put into the space between the paired projections 352 of the X-table 35, the X-table 35 also slides on the Y-table 34, as the X-slider 324 is driven to move. As a result, the projection lens 3 is shifted leftward (in the direction of X4).

Sine the spring piece 37 is rigidly secured to the boss 383 of the fitting section 38, it does not move while the X-slider 324 is driven to move. Since the projection 371 of the spring piece 37 is biased toward the X-slider 324 so as to abut the latter, the X-slider 324 receives resistance to a certain extent from the projection 371 of the spring piece 37 when it moves in the direction of the X-axis.

As the dial 321 is turned further until the projection lens 3 is moved substantially to the middle point of the hole 331A of the base section 33 as viewed in the direction of the X-axis, the projection 371 of the spring piece 37 comes into engagement with the recess 324C of the X-slider 324. As a result, the user senses a feeling of a click and hence can recognize that the optical axis of the projection lens 3 is shifted to the reference position in the direction of the X-axis.

As the dial 321 is turned further, the projection 371 of the spring piece 37 is disengaged from the recess 324C of the X-slider 324 so that the projection 371 and the X-slider 324 resist against each other once again.

While the movement of the projection lens 3 from the uppermost position to the lowermost position of its vertical moving range and the movement of the projection lens 3 from the right side to the left side of its horizontal moving range as viewed from the rear side of the projection 1 are described above, it will be appreciated that the above description is applicable to the movement of the projection lens 3 from the lowermost position to the uppermost position and the movement of the projection lens 3 from the left side to the right side.

(4) Projection Lens 3 and Head Body 7

Figure 11:
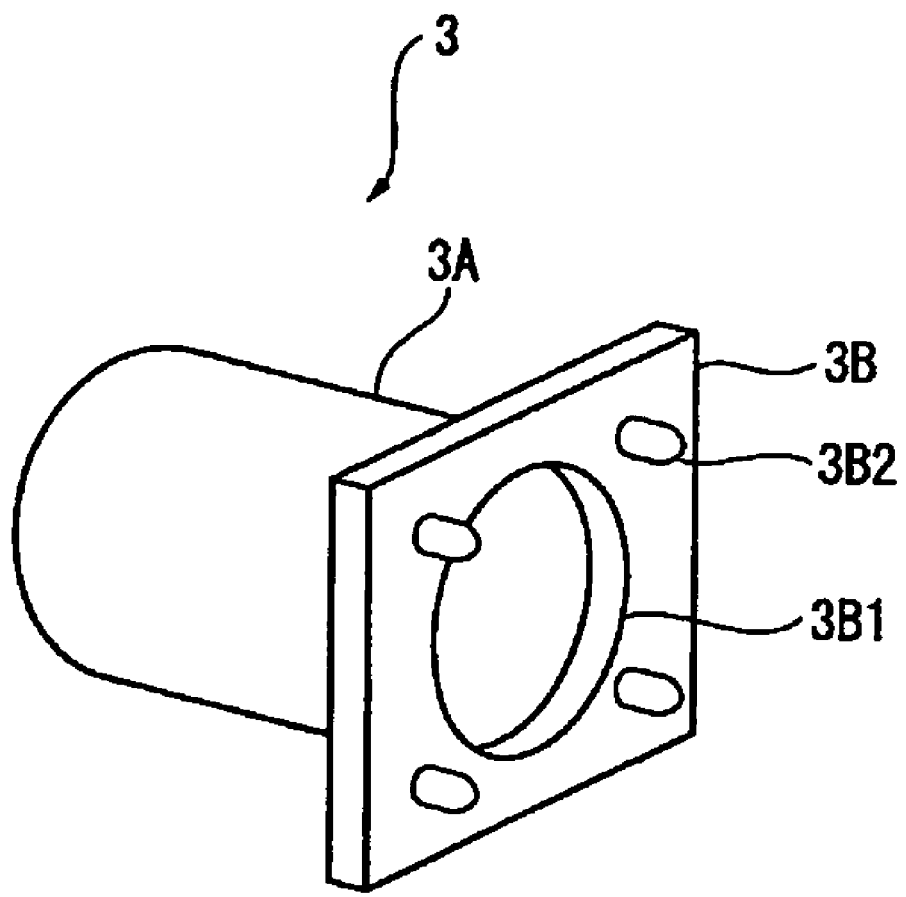
FIG. 11 is a schematic perspective view of the first embodiment, illustrating a flange of a projection lens as viewed from the incident-side of the light beam.
Figure 12:
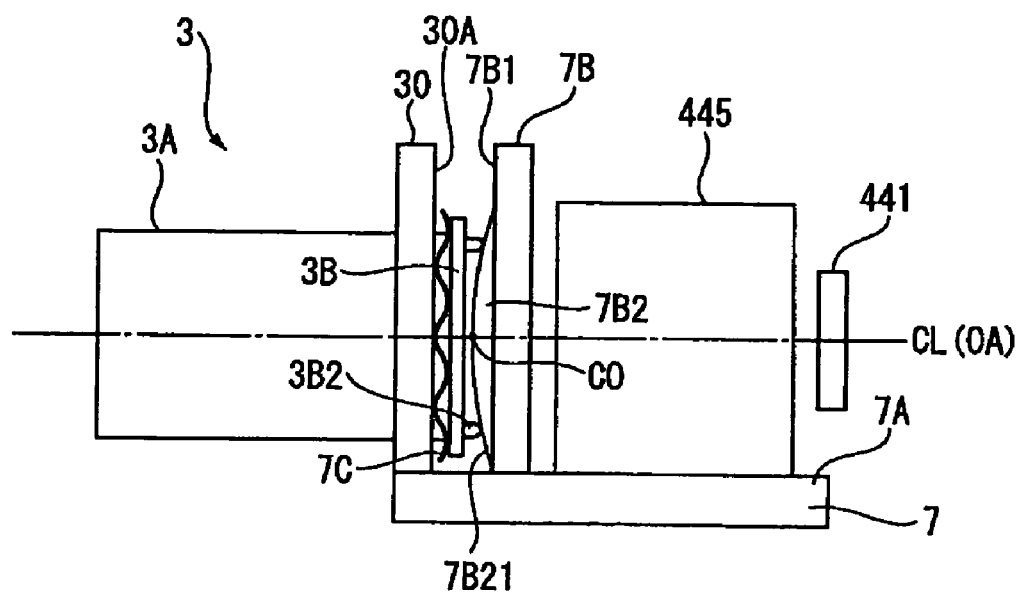
FIG. 12 is a schematic lateral view of the projection lens and a head body of the first embodiment.

FIG. 11 is a schematic perspective view showing the projection lens 3 as viewed from the incident-side of the light beam, and FIG. 12 is a schematic lateral view of the projection lens 3 and the head body 7.

As pointed out earlier, the projection lens 3 includes a plurality of lenses and a lens holding barrel 3A for containing the plurality of lenses in the inside. Attached to the lens holding barrel 3A on its incident-side of the light beam is a flange 3B for holding the projection lens 3 to the head body 7. The flange 3B protrudes from the lens supporting barrel 3A toward the direction perpendicular to the optical axis OA of the projection lens 3. Formed to the flange 3B on the incident-side of the light beam are four contact sections 3B2 protruding toward the lens contacting surface 7B21, the four contact sections being respectively formed at four corners of the substantially rectangular flange 3B. The contact sections 3B2 are adapted to contact the lens contacting surface 7B21 provided on the head body 7. The head body 7 is adapted to receive the optical components of the projector 1 to be mounted on it, including the liquid crystal panels 441, the cross dichroic prism 445 and so on. In addition to the above-listed optical components, the projection lens 3 and the projection lens position adjusting mechanism 30 are also fitted to the head body 7.

The head body 7 shows a substantially L-shaped lateral view and includes a horizontal part 7A that is the inner horizontal part of the letter L and a head section 7B that is the outer vertical part of the letter L. The head section 7B rises substantially vertically from a position near the end of the light beam emitting side of the horizontal part 7A.

The liquid crystal panels 441, the cross dichroic prism 445 and other optical components are mounted on the horizontal part 7A. The projection lens position adjusting mechanism 30 is arranged at the light beam emitting side of the head section 7B at a position separated from the latter. The projection lens position adjusting mechanism 30 has a face 30A perpendicular to the central axis CL of the light beam emitted from the liquid crystal panels 441. The flange 3B of the projection lens 3 is arranged between the perpendicular face 30A of the projection lens position adjusting mechanism 30 and the lens contacting surface 7B21 arranged on the head section 7B.

The head section 7B is a part to which the projection lens 3 is fitted. A flat section 7B1 and a projecting section 7B2 projecting from the flat section 7B1 toward the light beam emitting side of the projector 1 are formed on the surface of the light beam emitting side of the head section 7B.

The flat section 7B1 is a flat surface perpendicular to the central axis CL of the light beam emitted from the liquid crystal panels 441.

The light beam emitting side of the projecting section 7B2 serves as a lens contacting surface 7B21 for being contacted by the contact sections 3B2 of the projection lens 3. Although not shown in detail, the lens contacting surface 7B21 is curved surface which crosses the central axis CL of the light beam emitted from the liquid crystal panels 441 at one point CO. The curved surface has a profile which curves in accordance with curvature amount of the image forming surface on the base end side of the projection lens 3. More specifically, the lens contacting surface 7B21 is so formed as to contain the shifting range of the projection lens 3 that is shifted by the projection lens position adjusting mechanism 30, which is arranged vis-à-vis the lens contacting surface 7B21. The largest protruding amount of the lens contacting surface 7B21 is defined by the reference position of the optical axis OA of the projection lens 3 (the center CO in the direction of the X-axis and also in the direction of the Y-axis), and the protruding amount becomes smaller gradually from the center toward peripheral edge of the lens contacting surface 7B21. The method of defining the curvature of the lens contacting surface 7B21 will be described hereinafter.

The flange 3B of the projection lens 3 that is held in contact with the lens contacting surface 7B21 is biased toward the lens contacting surface 7B21 by a biasing member 7C, which may typically be a leaf spring. To be more accurate, the flange 3B of the projection lens 3 is disposed between the head section 7B and the projection lens position adjusting mechanism 30, and the contact sections 3B2 of the flange 3B are biased toward the lens contacting surface 7B21 by the biasing member 7C that is interposed between the flange 3B and the base section 33 of the projection lens position adjusting mechanism 30, while they are held in contact with the lens contacting surface 7B21.

Figure 13:
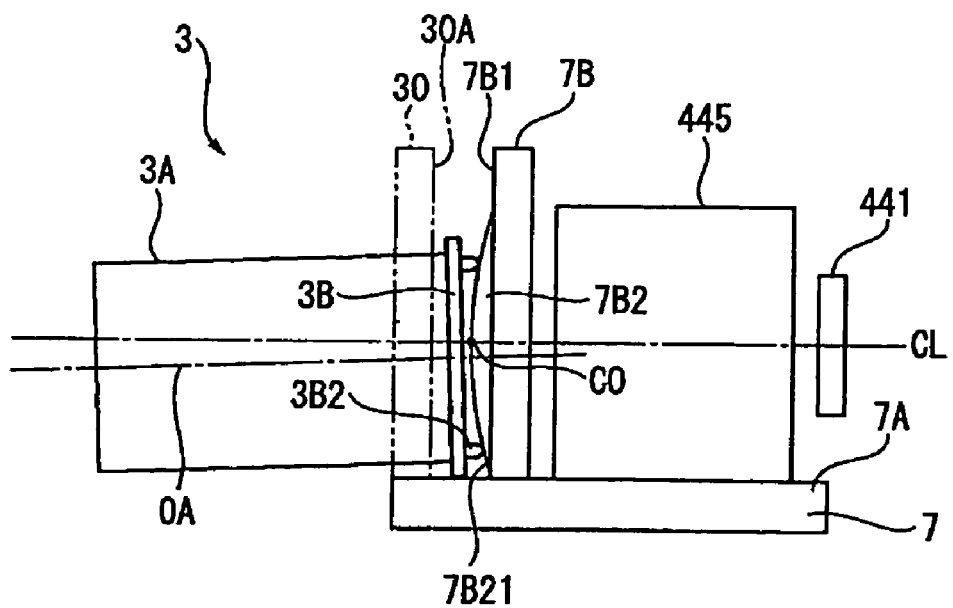
FIG. 13 is a schematic lateral view of the projection lens of the first embodiment, illustrating how the projection lens and the lens contacting surface contact each other.

FIG. 13 is a lateral view of the projection lens 3, illustrating how the lens is shifted. Note that the biasing member 7C shown in FIG. 12 is omitted from FIG. 13.

As shown in FIG. 12, the projection lens 3 is biased toward the lens contacting surface 7B21 by the biasing member 7C in a state where the contacting sections 3B2 of the flange 3B of the projection lens 3 are held in contact with the lens contacting surface 7B21. Thus, as shown in FIG. 13, when the projection lens 3 is shifted in the direction crossing the central axis CL of the light beam emitted from the liquid crystal panels 441, more specifically, when the projection lens 3 is shifted in the tilting direction perpendicular to the central axis CL of the light beam emitted from the liquid crystal panels 441 (the direction of Y3 or that of Y4 in FIG. 1) and in the direction perpendicular to the tilting direction of the projector 1 (the direction of X3 or that of X4 in FIG. 1) by the projection lens position adjusting mechanism 30, the projection lens 3 is forced to slide along the lens contacting surface 7B21. In other words, the projection lens 3 is slid along the lens contacting surface 7B21 by operating two dials 311, 321 shown in FIG. 1.

(5) Definition of the Curvature of the Lens Contacting Surface 7B21

Now, the method of defining the curvature of the lens contacting surface 7B21 will be described in detail below.

Firstly, the focal length of the projection lens 3 is measured relative to the image height. Assume here that the projection lens 3 has a focal length of 49.7 nm and the flange 3B has a vertical dimension (in the direction of the Y-axis) of 110 mm. The focal length, which is a distance between the light beam emitting side of the flange 3B and focal point, for each image height is measured using a collimator.

Figure 14:
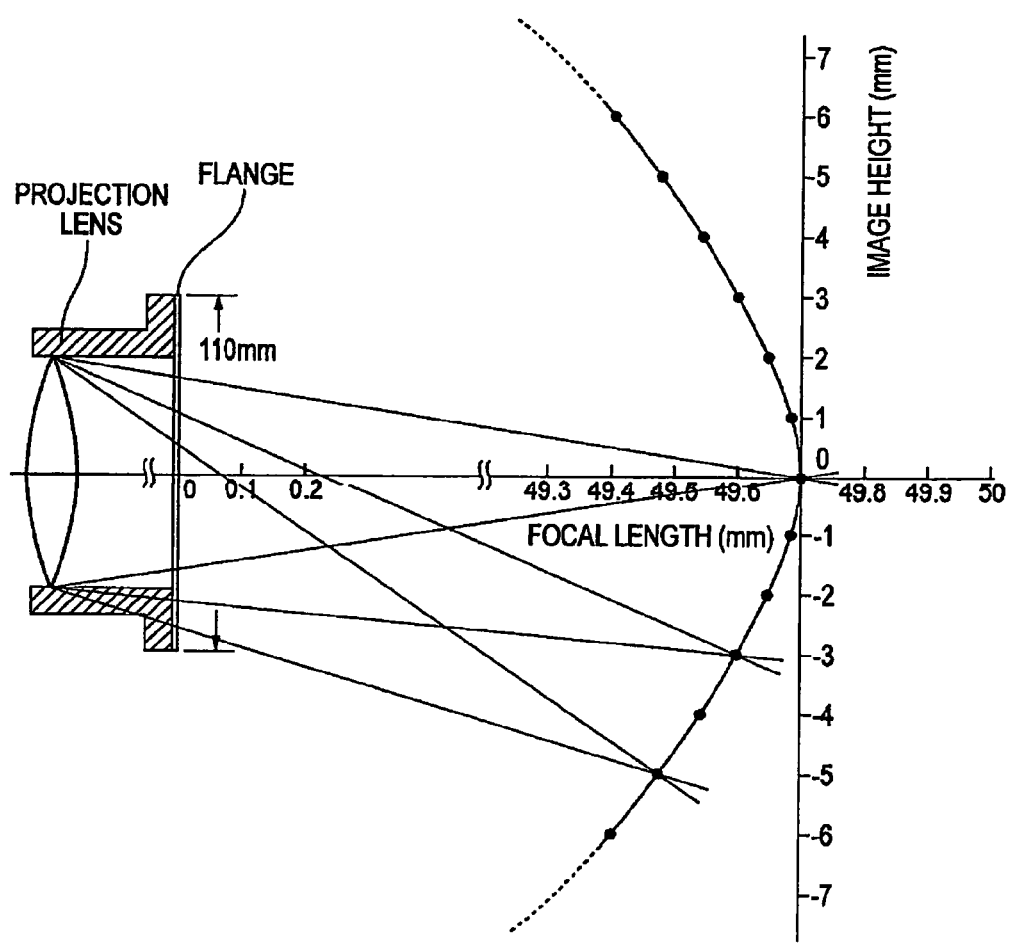
FIG. 14 is a graph illustrating the correspondence of the image height and the focal length of the projection lens of the first embodiment.

FIG. 14 is a graph illustrating the correspondence of the image height and the focal length of the projection lens 3 having a focal length of 49.7 mm.

It will be appreciated from FIG. 14 that the focal length of such a projection lens 3 varies as a function of the image height of the projection lens 3. In other words, the light beam striking the projection lens 3 forms an image in such a way that a point separated from the center of the projection lens 3 is found at a position close to the flange 3B because the distance from the end of the flange 3B at the light beam emitting side.

More specifically, the light beam striking the projection lens 3 at a position that makes the image height equal to 0 mm, or the light beam striking the center of the projection lens 3, is focused at a position separated from the end of the flange 3B by a liner distance of 49.7 mm. On the other hand, the light beam striking the projection lens 3 at a position that makes the image height equal to 3 mm, or the light beam striking a position separated from the center of the projection lens by 3 mm, is focused at a position separated from the end of the flange 3B by a linear distance of 49.6 mm. Additionally, the light beam striking the projection lens 3 at a position that makes the image height equal to 6 mm, or the light beam striking a position separated from the center of the projection lens by 6 mm, is focused at a position separated from the end of the flange 3B by a linear distance of 49.4 mm.

Such divergences of focal position can give rise to a curvature of image of the projection lens 3. In other words, when the optical axis of the projection lens 3 is shifted in one of the tilting directions of the projector 1 (in the direction of Y3 or Y4 in FIG. 1) and/or in one of the directions perpendicular to the tilting directions of the projector 1 (in the direction of X3 or X4 in FIG. 1) from the reference position (substantially the middle point of the moving range of the projection lens 3 along the X-axis and also along the Y-axis) by means of the projection lens position adjusting mechanism 30, the light beam emitted from the liquid crystal panels 441 through the cross dichroic prism 445 strikes the projection lens 3 at a position separated from the center of the projection lens 3 by an extent equivalent to the shift of the projection lens 3. Then, the focal point of the projection lens 3 that is defined to agree with the projection surface at the reference position is located in front of the projection surface. Therefore, the curvature of image will become remarkable to degrade the projected image because of the out of focus condition. It will be appreciated that the curvature of image can be corrected by dissolving the divergence of the focal position for each image height.

While the curvature of image of the projection lens 3 is attributable to the divergence of the focal position for each image height as pointed out above, it is difficult to shift the liquid crystal panels 441 corresponding to the shift of the projection lens 3 because the positions of the liquid crystal panels 441 for forming optical images are fixed in the projector 1. Since the focal length of the light beam striking the projection lens 3 at a position separated from the center thereof tends to become shorter than the focal length of the light beam striking the projection lens 3 at the center thereof as illustrated in FIG. 14, the focal point of the projection lens 3 can be made to agree with the liquid crystal panels 441 when the projection lens 3 is driven to move close to the liquid crystal panels 441 as the optical axis of the projection lens 3 is shifted in the direction of the X-axis or in the direction of the Y-axis from the above-described reference position (substantially the middle point of the moving range of the projection lens 3 along the X-axis and also along the Y-axis). More specifically, when the projection lens 3 is shifted, the curvature of image of the projection lens 3 can be corrected by letting the lens contacting surface 7B21 have a curved surface so as for the surface of the flange 3B of the projection lens 3 to get close to the liquid crystal panels 441 corresponding to the extent of the shift of the projection lens 3.

Now, the profile of the curved surface of the lens contacting surface 7B21, in other words, the protruding amount of the lens contacting surface 7B21 from the flat section 7B1 corresponding to the shifting position of the projection lens 3 will be obtained as below.

First, arranging a spacer having a predetermined size at the side of an end between the lens holding barrel 3A of the projection lens 3 and the flange 3B fitted to the corresponding end of the lens holding barrel 3A and measuring the size of the spacer for each image height when the focal point of the projection lens 3 is found on the plane separated from the flange 3B by a given constant distance. With this arrangement, it is safe to take the liquid crystal panels 441 and the image height respectively for the plane where the focal point of the projection lens 3 is found and for the extent of the shift of the projection lens 3.

In the above-measurement, the distance between the plane where the focal point of the projection lens 3 is found and the light beam emitting side of the flange 3B needs to be fixed, and in the present embodiment, it is fixed to 49.2 mm.

Figure 15:
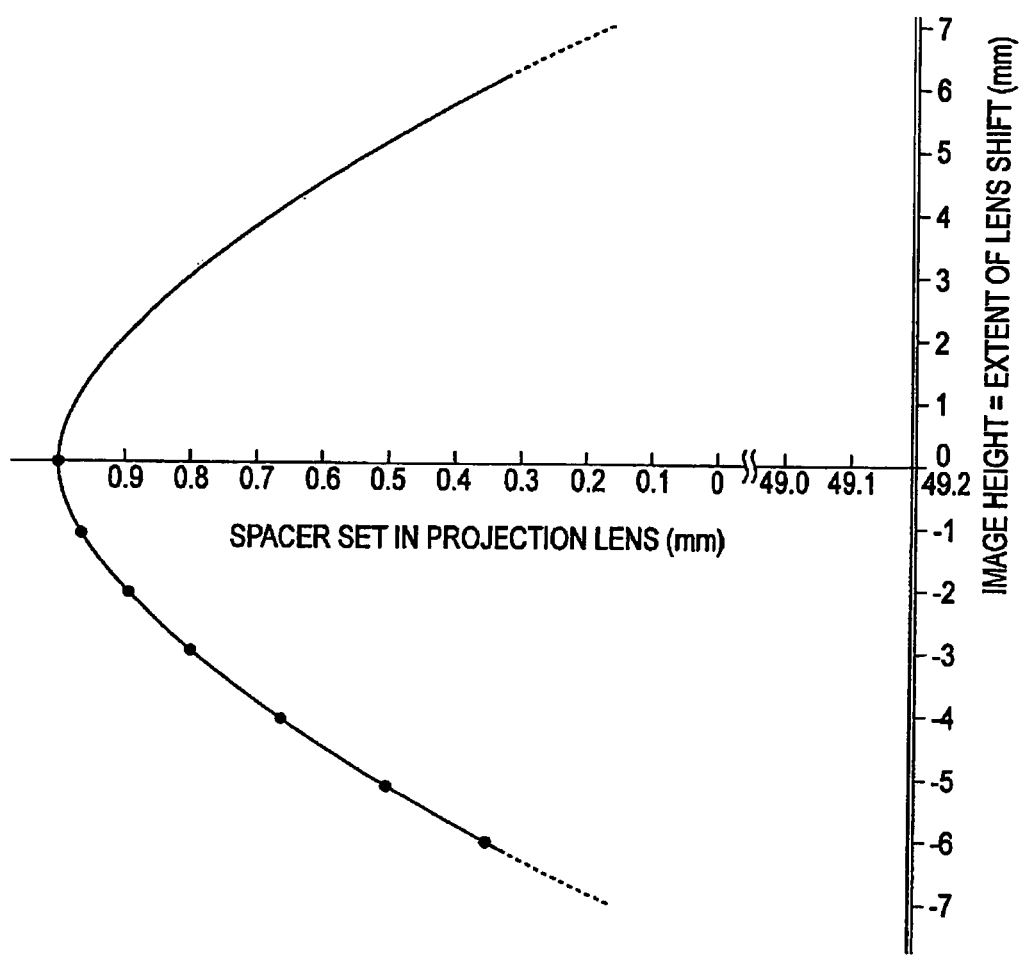
FIG. 15 is a graph illustrating the correspondence of the image height and the size of a spacer arranged in the projection lens of the first embodiment.

FIG. 15 is a graph illustrating the correspondence of the image height and the size of a spacer arranged between the lens holding barrel 3A and the flange 3B.

It is now possible to obtain the size of the spacer with which the focal point of the projection lens 3 is found on the above-defined plane for each image height by utilizing the results of observation illustrated in FIG. 15. More specifically, when the image height is 0 mm, it is possible to make the focal point of the projection lens 3 to be found on the plane separated from the flange 3B by 49.2 mm by arranging a spacer of 1.0 mm between the lens holding barrel 3A and the flange 3B. Similarly, when the image height is 2 mm and when the image height is 3 mm, it is possible to make the focal point of the projection lens 3 to be found on the plane by arranging respectively a spacer of 0.9 mm and a spacer of 0.8 mm between the lens holding barrel 3A and the flange 3B.

Since the spacer is arranged at the side of an end between the lens holding barrel 3A and the flange 3B, at the center of the projection lens 3 (the position at which the face of the flange 3B is crossed by the optical axis of the projection lens), the distance obtained by adding a half of the size of the spacer and the distance to the plane where the focal point of the projection lens 3 is found is the focal length of the projection lens 3 for each image height. Thus, as shown in FIG. 16, the curved surface of the lens contacting surface 7B21 can be obtained by determining the image heights first, in other words, by determining the values of half of the spacer size, which correspond to the shift amount of the projection lens 3, and then connecting the obtained points into a curved line.

It is possible to adjust the focal length of the projection lens 3 for each image height and correct the curvature of image of the projection lens 3 by driving the projection lens 3 to slide along the lens contacting surface 7B21 obtained by using the above method. In other words, it is possible to make the focal point of the projection lens 3 agree with the liquid crystal panels 441 by causing the lens contacting surface 7B21 of the projecting section 7B2 projecting from the head section 7B to contact the contact sections 3B2 formed on the flange 3B of the projection lens 3 and driving the projection lens 3 to shift along the lens contacting surface 7B21 by means of the projection lens position adjusting mechanism 30. With the above-described arrangement, it is possible to correct the curvature of image of the projection lens 3.

Figure 16:
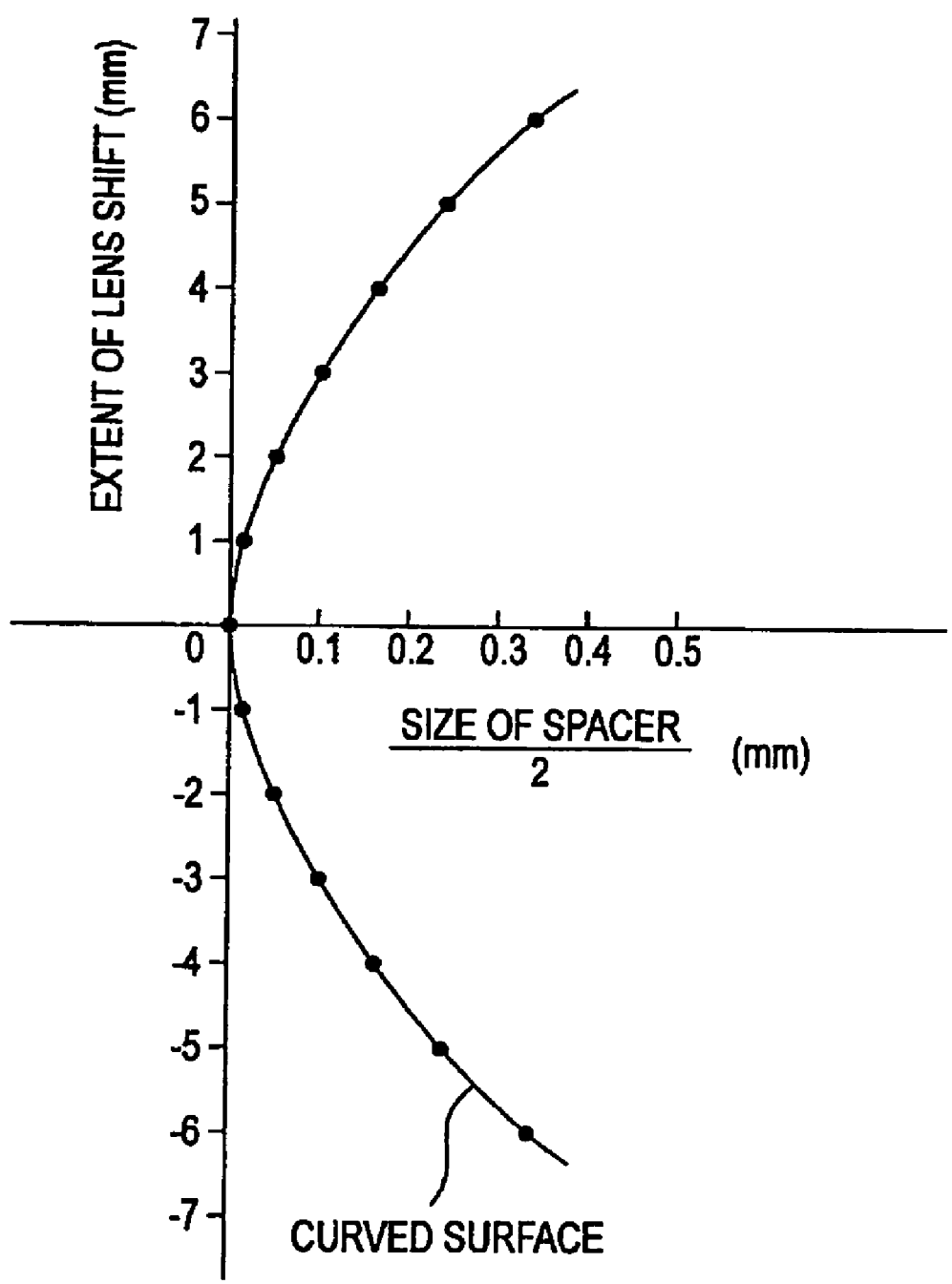
FIG. 16 is a graph illustrating the curved profile of the lens contacting surface that corresponds to the distance of shift of the projection lens of the first embodiment.

Incidentally, the data in FIG. 14 to FIG. 16 is for a projection lens (as the projection lens 3 herein) of which the spherical aberration has not been corrected. However, in the case of a general projection lens for a small-sized projector used for company meeting, home theater and the like, since the spherical aberration has already been corrected in some extent, variation in focal length in FIG. 14 and the values of the transverse axis in FIG. 15 and FIG. 16 should respectively be reduced to approximately $\frac{1}{10}$. Further, to enable the contact sections 3B2 formed on the flange 3B of the projection lens 3 to contact the lens contacting surface 7B21 over the entire curved surface as shown in FIG. 16 (the lens contacting surface 7B21), the difference of the protruding amount of the curved surface is required to be approximately 0.38 mm. However, in the case of aforesaid general projection lens, within the range in which the contact sections 3B2 contact the lens contacting surface 7B21, it is enough to set the difference of protruding amount of the curved surface between about 0.01 and about 0.1 mm.

(6) Advantages of the First Embodiment

The above-described embodiment of the present invention provides the following advantages.

(6-1) A the lens contacting surface 7B21 is formed on the surface of the light beam emitting side of the head section 7B, which is an outer vertical part of the head body 7, so as to project its curved surface by a distance that varies as a function of the curvature of image of the image forming plane of the light beam incident-side of the projection lens 3 and the projection lens 3 is driven to shift along the lens contacting surface 7B21 by the projection lens position adjusting mechanism 30 in the on of the X-axis and also in the direction of the Y-axis. Thus, it is possible to correct the partially blurred image, and to correct the curvature of image of the projection lens 3. As a result, it is possible to project clear images.

(6-2) Further, since the lens contacting surface 7B21 is formed to have a curved profile, and the curvature of image of the projection lens 3 is corrected by shifting the projection lens 3 along the lens contacting surface 7B21, it is not necessary to employ, for example, an expensive lens which has no image curvature for a projector to prevent degradation of the projected image. Also, since the curvature of image of the projection lens 3 can be corrected with such arrangement, it is possible to widen the range for selecting a lens for a projector and thereby to reduce the manufacturing cost of project 1.

(6-3) The lens contacting surface 7B21 has a curved profile of which the protruding amount becomes smaller gradually from the center thereof toward peripheral edge. With this arrangement, it is possible to correct the curvature of image of the projection lens 3 when the projection lens 3 is shifted not only in the tilting direction (the direction of the Y-axis) of the projector 1 but also in the direction perpendicular to the tilting direction (the direction of the X-axis), by the projection lens position adjusting mechanism 30. Thus, it is possible to correct the curvature of image of the projection lens 3 regardless of the shifting direction of the projection lens 3. Therefore, it is possible to project clear images.

(6-4) The flange 3B of the projection lens 3 is arranged between the lens contacting surface 7B21 formed on the head section 7B of the head body 7 and the face 30A of the projection lens position adjusting mechanism 30 that is arranged vis-à-vis the light beam emitting side of the head section 7B and a biasing member 7C, which is typically realized by a leaf spring, is arranged between the projection lens position adjusting mechanism 30 and the flange 3B. With this arrangement, it is possible to hold the projection lens 3 in a state being biased to the lens contacting surface 7B21 formed on the light beam emitting side of the head section 7B. Thus, it is possible to reliably shift the projection lens 3 along the lens contacting surface 7B21, while the projection lens 3 is reliably held in contact with the lens contacting surface 7B21. As pointed out above, the projection lens 3 can be held in contact with and supported by the lens contacting surface 7B21 by means of a simple arrangement. Additionally, it is possible to adjust the friction that arises when the projection lens 3 is driven to slide along the lens contacting surface 7B21 by adjusting the biasing force of the biasing member 7C. Thus, it is possible to improve the sliding ability of the projection lens 3.

(6-5) Contact sections 3B2 that have a semispherical front end are formed at the four corners of the surface of the light beam incident-side of the flange 3B of the projection lens 3 so as to contact the lens contacting surface 7B2. With this arrangement, the contact sections 3B2 of the flange 3B contact the lens contacting surface 7B21 when the projection lens 3 is driven to shift so that it is possible to further improve the sliding ability of the projection lens 3 along the lens contacting surface 7B21.

2. Second Embodiment

Now, the second embodiment of projector according to the present invention will be described below. While the second embodiment of a projector has a configuration substantially same as that of the above-described first embodiment of the projector 1, it differs from the first embodiment in that the lens contacting surface 8B13, which contacts the contact sections 3B2 of the flange 3B of the projection lens 3, is provided with a first curved section 8B11 and a second curved section 8B12. The components of the second embodiment that are same as or similar to those of the first embodiment are denoted respectively by the same reference symbols and will not be described any further.

Figure 17:
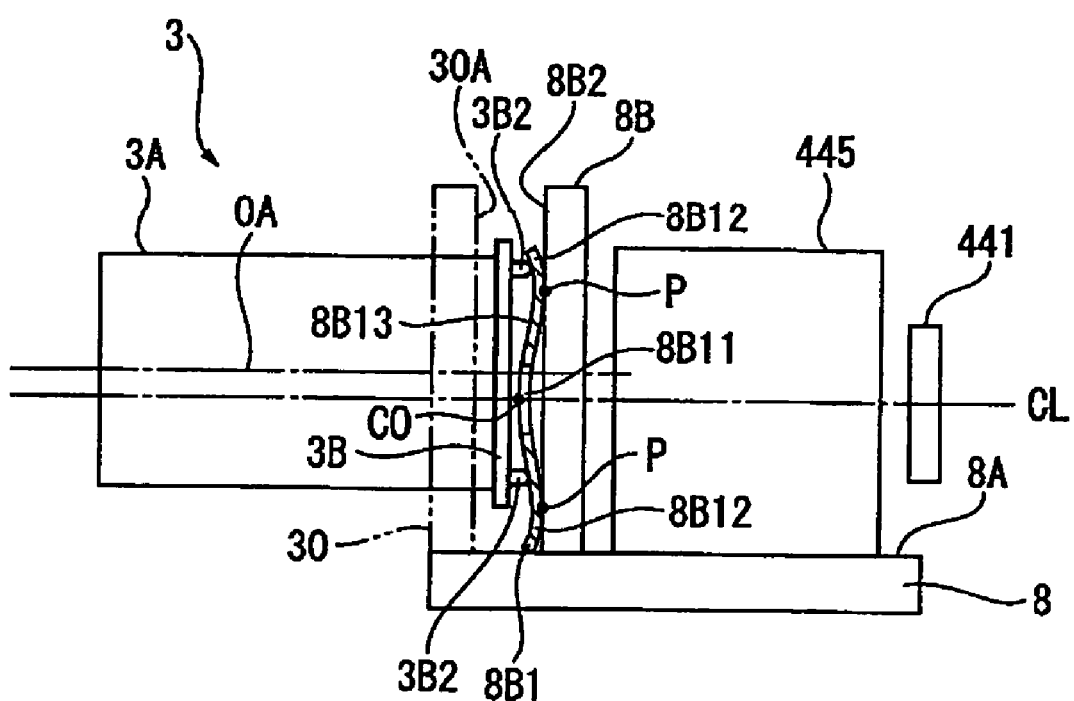
FIG. 17 is a schematic lateral view of the head body of a second embodiment of projector according to the present invention.

FIG. 17 is a schematic lateral view of the head body 8 of the second embodiment of projector according to the present invention.

The head body 8 of the second embodiment of projector shows a substantially L-shaped lateral view and includes a horizontal part 8A that is the inner horizontal part of the letter L and a head section 8B that is the outer vertical part of the letter L. The liquid crystal panels 441, the cross dichroic prism 445 and other optical components are mounted on the horizontal part 8A.

As shown in FIG. 17, the surface of the light beam emitting side of the head section 8B is flatly formed as a flat section 8B2, and the flat section 8B2 is attached with a plate-like body 8B1 having a curved profile as a separate member of the head body 8. The flat section 8B2 is a flat surface perpendicular to the central axis CL of the light beam emitted from the liquid crystal panels. The surface of the light beam emitting side of the plate-like body 8B1 is formed as a lens contacting surface 8B13 having a profile which curves in accordance with curvature amount of the image forming surface of the light beam incident-side of the projection lens 3. The contact sections 3B2 formed on the flange 3B of the projection lens 3 contact and move along the lens contacting surface 8B13. The lens contacting surface 8B13 has a first curved surface section 8B11 and a second curved surface section 8B12 being formed along the peripheral edge of the first curved surface section 8B11.

Although not shown in FIG. 17, the projection lens position adjusting mechanism 30 is arranged at the light beam emitting side of the head section 8B and the flange 3B of the projection lens 3 is arranged between the projection lens position adjusting mechanism 30 and the head section 8B. Additionally, a biasing member (not shown) such as a leaf spring is arranged between the flange 3B and the projection lens position adjusting mechanism 30 so that the flange 3B is biased toward the lens contacting surface 8B13 by the biasing force of the biasing member.

The first curved surface section 8B11 is made to show a substantially circular contour as viewed from the light beam emitting side, and protrudes toward the side of the projection lens 3.

To describe it in detail, the center CO of the first curved surface section 8B11 corresponds to the reference position of the optical axis OA of the projection lens 3 (the middle point in the direction of the X-axis and also in the direction of the Y-axis) and the center CO of the first curved surface section 8B11 projects to the largest extent. In other words, the protruding amount of the first curved surface section 8B11 diminishes gradually from the center toward the peripheral edge thereof. Incidentally, the profile of the first curved surface section 8B11 is set using the method described in the first embodiment. Also, in the case of aforesaid general projection lens, within the range in which the contact sections 3B2 contact the first curved surface section 8B11, it is enough to set the difference of protruding amount of the curved surface between about 0.01 and about 0.1 mm.

The second curved section 8B12 is formed along the peripheral edge of the first curved surface section 8B11 so as to project more than the peripheral part P of the curved surface section 8B11 where the protruding amount is minimal in itself. In other words, the second curved section 8B12 is formed to the outside of the peripheral part P of the first curved surface section 8B11 in such a way that it is curved mildly and the protruding amount thereof which is directed to the light beam emitting side, changes continuously. The profile of the second curved section 8B12 is set in accordance with the profile of the first curved section 8B11. In other words, the profile is so set that when the projection lens 3 slides with the any of the plural contact sections 3B2 contacting the first curved surface section 8B11, the other contact sections 3B2 are contacting and sliding along the second curved section 8B12, and thereby the optical axis OA of the projection lens 3 is substantially in parallel with the central axis CL of the light beam emitted from the liquid crystal panels 441 through the cross dichroic prism 445.

The second embodiment of projector according to the present invention and having the above-described head body 8 provides the following advantage in addition to the advantages of the projector 1 listed above by referring to the first embodiment.

In other words, since the second curved section 8B12 protrudes in the same direction as the first curved surface section 8B11, even when the projection lens 3 is shifted to the edge of the lens contacting surface 8B13, the optical axis of the projection lens 3 is in parallel with the central axis of the light beam emitted from the liquid crystal panels 441 through the cross dichroic prism 445. Here, if the second curved section 8B12 is not be formed as in the first embodiment, in other words, as shown in FIG. 13, in a case where the lens contacting surface 7B21 has a profile of which the protruding amount becomes smaller gradually from the center thereof toward peripheral edge, when the projection lens 3 is shifted to the edge of the lens contacting surface 7B21, the angle defined by the optical axis OA and the central axis CL of the light beam emitted from the liquid crystal panels 441 will become large, thereby there might be the possibility of causing partially blurred image. Therefore, in the present embodiment, by forming the second curved section 8B12 which protrudes in the same direction as the first curved surface section 8B11 and has the protruding amount larger than that of the peripheral edge of the first curved surface section 8B11, the optical axis of the projection lens 3 is in parallel with the central axis of the light beam emitted from the liquid crystal panels 441 even when the projection lens 3 is shifted to the edge of the lens contacting surface 8B13. Then, it is possible to suppress the partial blur of the projected image and also prevent degradation of the projected image. Thus, it is possible to improve the accuracy of correcting the partial blur of the projected image and increase the degree of freedom of projection of an optical image.

Incidentally, since the partial blur of the projected image caused by inclination of optical axis OA of the projection lens 3 can be ignored if the curvature of the lens contacting surface 7B21 is small to a certain level, as the lens contacting surface 7B21 in the first embodiment, the problem of the present invention still can be solved even with a curved surface having a profile of which the protruding amount becomes smaller gradually from the center thereof toward peripheral edge.

3. Modified Embodiments

While the present invention is described above in terms of the best mode of carrying out the present invention, the present invention is by no means limited to the above-described mode of carrying out. In other words, while the present invention is illustrated and described above in terms of specific embodiments, it may be obvious to those skilled in the art that the described embodiments can be modified and altered in various different ways without departing from the object and scope of the present invention particularly in terms of the profile and the material of each of the components and the number of each type of component.

Therefore, the above description of profiles and materials are only for the purpose of facilitating understanding of the present invention and do not limit the present invention. In other words, the description using the denominations of members entirely or partly omitting description of profiles and materials is also included in the present invention.

The profile, the protruding amount, and the protruding direction of the lens contacting surface 7B21, the first curved surface section 8B11, and the second curved section 8B12 are not limited to the description of the above embodiments, but can be changed in accordance with the properties of the projection lens 3.

For example, in the above embodiments, though the lens contacting surface 7B21, the first curved surface section 8B11, and the second curved section 8B12 protrude toward the light beam emitting side, they can protrude toward opposite side depending on the properties of the projection lens 3.

Further, in the above embodiments, though the lens contacting surface 7B21 and the first curved surface section 8B11 show a substantially circular contour as viewed from the light beam emitting side, and have curved profile of which the protruding amount becomes smaller gradually from the center thereof toward peripheral edge, they should not be limited thereto. For example, the lens contacting surface 7B21 and the first curved surface section 8B11 can show a rectangular shape as viewed from the light beam emitting side, and the cross section thereof in the Y-axis direction can be substantially a semicircle. With such arrangements, it is still possible to dissolve the partial blur of the projected image and correct the curvature of image if the projection lens 3 is driven to shift in the tilting direction of the projector 1 (in the direction of Y3 and in the direction of Y4 in FIG. 1).

While the flange 3B of the projection lens 3 of each of the above-described embodiments is biased toward the lens contacting surface 7B21 or 8B13 by the biasing member 7C, which may typically be a leaf spring, the flange 3B may be biased by some other arrangement. For example, the flange 3B may alternatively be biased toward the lens contacting surface 7B21 or 8B13 by means of a spherical resilient member that is typically made of rubber in such a way that the sliding ability of the flange 3B is secured. In short, any arrangement may be used for biasing the flange 3B toward the lens contacting surface 7B21 or 8B13 so long as it is possible to make the flange 3B of the projection lens 3 reliably contact the lens contacting surface 7B21 or 8B13, whichever appropriate, and driven the projection lens 3 to shift by means of the projection lens position adjusting mechanism 30.

While the contact sections 3B2 are formed respectively at the four corners of the surface of the light beam incident-side of the flange 3B so as to project from the surface and contact the lens contacting surface 7B21 or 8B13 in each of the above-described embodiments, the present invention is by no means limited thereto. It is not necessary to arrange such contact sections 3B2. Alternatively, contact sections different from the above-described shapes may be arranged. For example, the surface of the light beam incident-side of the flange 3B may be curved along the edges thereof. However, it should be noted that the above-described contact sections 3B2 can stably and reliably cause the flange 3B to contact the lens contacting surface 7B21 or 8B13 and improve the sliding ability of the projection lens 3.

Further, in the above embodiments, though the projection lens position adjusting mechanism 30 moves the projection lens 3 along two directions of the X-axis direction and Y-axis direction, it should not be limited thereto, but can move the projection lens 3 along any direction perpendicular to the central axis CL of the light beam emitted from the liquid crystal panels 441.

Furthermore, in the above embodiments, though the optical axis OA of the projection lens 3 corresponds to the central axis CL of the light beam emitted from the liquid crystal panels 441 in the case when the optical axis OA of the projection lens 3 is located at the reference position in the direction of the X-axis or in the direction of Y-axis, they are not necessary to correspond to each other.

While each of the above-described embodiments has an optical unit 4 showing a substantially L-shaped plan view, the present invention is by no means limited thereto and may alternatively have an optical unit showing a substantially U-shaped plan view.

While each of the above-described embodiments exemplifies the projector 1 using three liquid crystal panels 441, the present invention is by no means limited thereto and may alternatively include a projector using a single liquid crystal panel, a projector using two liquid crystal panels, or a projector using four or more than four liquid crystal panels.

While each of the above-described embodiments has transmission type liquid crystal panels whose light beam incident-side surface and light beam emitting side surface are different, the present invention is by no means limited thereto and may alternatively include reflection type liquid crystal panels whose light beam incident-side surface also operates as light beam emitting side surface.

While liquid crystal panels are used as an optical modulator in each of the above-described embodiments, an optical modulator other than liquid crystal panels such as devices realized by using micro-mirrors may alternatively be used for the purpose of the present invention. Then, the polarization plates at the light beam incident-side and at the light beam emitting side can be omitted.

While the above-described embodiments are front type projectors adapted to project an image from the viewing side of the screen, the present invention is also applicable to a rear type projector adapted to project an image from the side opposite to the viewing side of the screen.

The priority application Numbers JP2004-166273 and JP2005-159974 upon which this patent application is based are hereby incorporated by reference.

What is claimed is:

1. A projector having a light source; an optical modulator for modulating light beam emitted from the light source according to image information and forming an optical image; and a projection lens, which includes a plurality of lenses and a lens barrel for containing the plurality of lenses thereinside, for enlarging and projecting the optical image formed by the optical modulator; the projector comprising:
 a structure showing a substantially L-shaped lateral contour and including an inner horizontal section to which the optical modulator is attached, and an outer vertical section to which the projection lens is attached, each of both sections having an L-shaped lateral contour; and
 a lens shifting mechanism for shifting the projection lens in a direction orthogonal to the central axis of the light beam emitted from the optical modulator along the outer vertical section; wherein
 the lens barrel has a flange projecting to the outside of the lens barrel at the base end side of the projection direction so as for the lens barrel to be fitted to the outer vertical section;
 the outer vertical section has a lens contacting surface projected and curved in accordance with a field curvature amount of the image forming surface on the base end side of the projection lens so as to contact the flange along the shifting direction being shifted by the lens shifting mechanism; and
 the projection lens moves along the lens contacting surface as the projection lens is shifted by the lens shifting mechanism.

2. The projector according to claim 1, wherein
 in a moving range of the projection lens along the lens contacting surface, the difference of protruding amount of the lens contacting surface is between 0.01 and 0.1 mm from a flat part of the outer vertical section.

3. The projector according to claim 1, wherein
 the lens shifting mechanism is adapted to shift the projection lens in the tilting direction of the projector and also in a transversal direction perpendicular to the tilting direction; and the lens contacting surface has a curved profile of which the protruding amount becomes smaller gradually from the center thereof toward peripheral edge.

4. The projector according to claim 1, wherein
 the lens contacting surface has a first curved surface section and a second curved surface section being formed along the peripheral edge of the first curved surface section, the protruding amount of the second curved surface being larger than that of the peripheral edge of the first curved surface section.

5. The projector according to claim 1, wherein
 the lens shifting mechanism is arranged with a gap between itself and the outer vertical section so as to make it correspond to the lens contacting surface and cover the outer vertical section;
 the flange of the lens barrel is placed in the gap; and
 a biasing member is arranged between the flange and the lens shifting mechanism so as to bias the flange toward the outer vertical section to force the flange to contact with the lens contacting surface.

6. The projector according to claim 1, wherein
 contact sections are formed at the end of the flange along the shifting directions so as to project from the surface opposed to the lens contacting surface of the flange and contact the lens contacting surface.

7. A projector comprising:
 a light source;
 an optical modulator for modulating light beam emitted from the light source according to image information;
 a projection lens, which includes a plurality of lenses and a lens barrel for containing the plurality of lenses thereinside, for enlarging and projecting the optical image formed by the optical modulator;
 a lens shifting mechanism having an operating section for shifting the projection lens in a direction crossing the central axis of the light beam emitted from the optical modulator;
 a structure that has an outer vertical section to which the projection lens is attached; and
 a curved surface provided on the outer vertical section, which crosses the central axis of the light beam emitted from the optical modulator at one point, the curved surface having a profile which curves in accordance with a field curvature amount of an image forming surface on a base end side of the projection lens, and the projection lens sliding along the curved surface by operating the operating section.

8. The projector according to claim 7, wherein
 the curved surface is formed in a manner of being protruded from a flat surface perpendicular to the central axis of the light beam emitted from the optical modulator; and
 in the moving range of the projection lens along the curved surface, the difference of protruding amount of the curved surface is between 0.01 and 0.1 mm from the flat surface.

9. The projector according to claim 7, wherein
 the lens shifting mechanism is adapted to shift the projection lens in the tilting direction of the projector and also in a direction perpendicular to the tilting direction; and
 the curved surface has a profile of which the protruding amount becomes smaller gradually from the center thereof toward peripheral edge.

10. The projector according to claim 7, further comprising:
- a flange provided on the light incident side of the projection lens and protruding from the lens barrel in the direction orthogonal to the optical axis of the projection lens;
- a perpendicular face perpendicular to the central axis of the light beam emitted from the optical modulator and included in the lens shifting mechanism, the flange being disposed between the perpendicular face of the lens shifting mechanism and the curved surface; and
- a contact section provided on a surface of the flange, the contact section protruding toward the curved surface to contact the curved surface and sliding along the curved surface as the projection lens is shifted by the lens shifting mechanism.

11. The projector according to claim 10, wherein
the curved surface has a first curved surface section and a second curved surface section being formed along the peripheral edge of the first curved surface section, the protruding amount of the second curved surface being larger than that of the peripheral edge of the first curved surface section.

12. The projector according to claim 10, further comprising:
- a biasing member arranged between the perpendicular face of the lens shifting mechanism and the flange so as to bias the flange toward the curved surface to bring the contact sections of the flange into contact with the curved surface.

13. The projector according to claim 11, further comprising:
- a biasing member arranged between the perpendicular face of the lens shifting mechanism and the flange so as to bias the flange toward the curved surface to bring the contact sections of the flange into contact with the curved surface.

* * * * *